US008714280B2

(12) United States Patent
Moreno et al.

(10) Patent No.: US 8,714,280 B2
(45) Date of Patent: May 6, 2014

(54) VIBRATION DAMPENING FOR A POWER TOOL

(75) Inventors: Jaime Moreno, Arlington Heights, IL (US); Harald Krondorfer, Aurora, OH (US); Holger Frank, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 763 days.

(21) Appl. No.: 12/524,856

(22) PCT Filed: Feb. 5, 2008

(86) PCT No.: PCT/US2008/001536

§ 371 (c)(1), (2), (4) Date: Feb. 3, 2011

(87) PCT Pub. No.: WO2008/097555

PCT Pub. Date: Aug. 14, 2008

(65) Prior Publication Data

US 2011/0120740 A1 May 26, 2011

Related U.S. Application Data

(60) Provisional application No. 60/899,952, filed on Feb. 7, 2007.

(51) Int. Cl.

| | |
|---|---|
| ***B25D 17/00*** | (2006.01) |
| ***B23D 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |

(52) U.S. Cl.
USPC ........................................ 173/162.2; 173/210

(58) Field of Classification Search
CPC ........................................................ B25D 17/24
USPC ..................... 173/162.2, 162.1, 210–211, 170
See application file for complete search history.

(56) References Cited

U.S. PATENT DOCUMENTS 4,749,049 A * 6/1988 Greppmair ................. 173/162.2
5,335,455 A 8/1994 Bergner
5,375,666 A * 12/1994 Pettet et al. ................ 173/162.1
5,692,306 A 12/1997 Stoll et al.
5,692,574 A * 12/1997 Terada ....................... 173/162.2

(Continued)

FOREIGN PATENT DOCUMENTS

| | | |
|---|---|---|
| EP | 0191336 | 8/1986 |
| EP | 1510298 | 2/2005 |
| GB | 2137132 | 10/1984 |

OTHER PUBLICATIONS

European Search Report in corresponding European patent application (i.e., EP 08 72 5203) mailed Jan. 24, 2011 (2 pages).

(Continued)

*Primary Examiner* — Robert Long
(74) *Attorney, Agent, or Firm* — Maginot, Moore & Beck

(57) ABSTRACT

A power tool includes a body and a housing surrounding at least a portion of the body. The power tool also includes a first isolator positioned between the body and the housing and in contact with the body and the housing. The power tool also includes a first fastener connected to the housing to position the first isolator with respect to the housing.

9 Claims, 16 Drawing Sheets

(56) References Cited

U.S. PATENT DOCUMENTS

| | | | | |
|---|---|---|---|---|
| 5,697,456 | A | 12/1997 | Radle et al. | |
| 5,769,174 | A | 6/1998 | Lee et al. | |
| 5,927,407 | A * | 7/1999 | Gwinn et al. | 173/162.2 |
| 6,076,616 | A * | 6/2000 | Kramp et al. | 173/162.2 |
| 6,286,610 | B1 * | 9/2001 | Berger et al. | 173/162.1 |
| 6,309,183 | B1 * | 10/2001 | Bucher et al. | 416/210 R |
| 6,416,030 | B1 | 7/2002 | Bergdahl et al. | |
| 6,863,499 | B2 * | 3/2005 | Pearce | 416/210 R |
| 6,935,842 | B2 * | 8/2005 | Tai | 416/210 R |
| 7,201,643 | B2 * | 4/2007 | Dineen et al. | 451/356 |
| 7,396,210 | B2 * | 7/2008 | Bucher et al. | 416/210 R |
| 7,591,325 | B2 * | 9/2009 | Robieu | 173/162.2 |
| 7,819,203 | B2 * | 10/2010 | Sato et al. | 173/210 |
| 7,850,055 | B2 * | 12/2010 | Niblett et al. | 227/156 |
| 8,069,930 | B2 * | 12/2011 | Engelfried | 173/162.2 |
| 2005/0095135 | A1 * | 5/2005 | Bucher et al. | 416/210 R |
| 2006/0117581 | A1 * | 6/2006 | Oki et al. | 30/392 |
| 2006/0219418 | A1 * | 10/2006 | Arakawa et al. | 173/162.2 |
| 2009/0266571 | A1 * | 10/2009 | Baumann et al. | 173/162.2 |
| 2010/0012339 | A1 * | 1/2010 | Hahn et al. | 173/162.2 |

OTHER PUBLICATIONS

Bosch Angle Grinders Operating Safety Instructions for Model 1873 Bosch Angle Grinders, downloaded Nov. 15, 2006 from http://www.boschtools.com (12 pages).

* cited by examiner

VIBRATION DAMPENING FOR A POWER TOOL

This application is national stage submission under 35 USC 371 based on PCT patent application no. PCT/US2008/001536 filed on Feb. 5, 2008, which in turn, is a non provisional of provisional patent application No. 60/899,952 filed on Feb. 7, 2007. The disclosures of the two above-identified patent applications are herein incorporated by reference in their entirety.

FIELD OF THE INVENTION

The present invention relates to a power tool. More specifically, the present invention relates to a vibration dampener for a power tool.

BACKGROUND OF THE INVENTION

Hand-held power tools, for example, power hammers, drills and saws are typically powered by an electric motor. Such powered tools may alternately be powered by pneumatic motors. The motors generate vibrations and frequently some tools, for example cutting tools such as saws, may generate vibrations as well. The vibrations from the tools and motors of power tools migrate toward the handles and cause fatigue as well as interference with the control of the power tool.

Attempts have been made to minimize the effect of vibration by, for example, providing padded handles or other low cost devices to dampen some of the vibrations. The use of a padded handle may not be effective in reducing the vibration to a sufficient level to minimize fatigue of an operator. There is, thus, a need to find a solution to a problem that is cost effective and also conforms to new regulations. Such new regulations exist, for example, in the European Union.

Further, the use of a vibration isolation system that provides the operator lateral stability and torsion control over the tool when shear and compression loads are present is desirable.

SUMMARY OF THE INVENTION

The vibration dampened handle of the present invention is used on, for example, a hand tool that may have a two piece housing that is split along a transverse handle axis and the longitudinal axis of the hand tool. In general, the vibration reducing feature may be in the form of a compressive, resilient material that is positioned between the motor and the handle to isolate the motor vibration from the handle. In particular, the vibration reducing feature is in the form of four hollow cylindrical compressible, resilient dampeners positioned in interference in openings between tubular bosses and pockets in the housing halves, with two bosses and two pockets in each housing half.

The dampeners absorb mechanical energy as it is transferred from the body of the tool to the handle portion. One handle portion of the two piece handle housing is secured to the other handle portion by two spaced apart cap screws. Each screw fits into a boss on each housing half, with the dampeners surrounding the bosses. In an alternate configuration the central openings of the dampeners are in interference with the bosses in the housing as well.

The present invention provides a vibratory tool which has cylindrical vibration dampeners to isolate the handle from vibration generated by the vibration tool in vibrations induced during cutting applications.

An embodiment of the invention provides a power tool including a tool body and a handle composed of two halves mounted to the tool body at two upper vibration isolation joints and two lower isolation joints. The four joints provide the means of absorption in isolation of vibrations by allowing the handle to move relative to the tool body while giving the operator lateral stability and torsion control over the tool. The tool body has clearance all the way around the handle to avoid any contact between the handle and the tool body.

Each joint of the four joints has a cylindrical dampener element that is captured between the tool body and the handle. The cylindrical element can be captured in at least two different ways. The first way is to capture the cylindrical dampener element by having a tight fit between a cylindrical pocket on a tool body and the outside of the cylindrical dampener element at the same time having a tight fit between cylindrical pocket and the outside diameter of the cylindrical dampener element. In addition, the cylindrical dampener element bottoms onto a rim in the tool body and an interior wall of the handle housing. This first configuration will allow the cylindrical dampener element to isolate and absorb vibrations under shear conditions.

The present invention may include a further embodiment that provides a power tool including a tool body and a handle composed of two halves similar to the first-mentioned embodiment. In the second embodiment the cylindrical dampener central opening is tightened against the bosses for supporting the fasteners. This configuration allows the cylinder to isolate and absorb vibrations under compression conditions. The device includes screw bosses going through the center of the cylindrical dampeners. These screw bosses provide a safety feature against separation of the handle from the motor.

The proposed embodiments of the present invention including the arrangement of the dampener or isolators allows for a very easy assemble. The dampeners can be put into position while the two clam shells are open. Later the clam shells are closed around the motor housing. This simple assembly and the fact that the proposed dampeners or isolators can all be made of the same material size and shape allows for a cost effective design.

Depending on the characteristics of the vibrations, in another aspect of the present inventions, a different stiffness may be used for the upper and lower dampener elements, allowing for an optimal reduction of the vibration levels that are transferred to the user's hand.

In one embodiment of the invention, a power tool is provided. The power tool includes a body and a housing surrounding at least a portion of the body. The power tool also includes a first isolator positioned between the body and the housing and in contact with the body and the housing. The power tool also includes a first fastener connected to the housing to position the first isolator with respect to the housing.

According to an aspect of the invention, the power tool also includes a second isolator positioned between the body and the housing and in contact with the body and the housing and a second fastener connected to the housing to position the second isolator with respect to the housing.

According to another aspect of the invention, the body includes a first boss defining a first pocket. The first pocket receives at least a portion of the first isolator. The body includes a second boss defining a second pocket for receiving at least a portion of the second isolator. The housing defines a first cavity positioned adjacent the first boss and a second cavity positioned adjacent the second boss. The housing defines the first cavity and the second cavity providing a restraint for the first boss and the second boss.

According to another aspect of the invention, the first isolator and the second isolator have substantially the same dimensions.

According to another aspect of the invention, the first isolator and the second isolator are made of resilient, compressible materials. The first isolator has a first isolator stiffness and the second isolator has a second isolator stiffness. The first isolator stiffness being substantially different than the second isolator stiffness.

According to another aspect of the invention, the first isolator and the second isolator have substantially the same dimensions.

According to another aspect of the invention, the body defines a pocket for receiving at least a portion of the first isolator.

According to another aspect of the invention, the pocket of the body is generally cylindrical.

According to another aspect of the invention, the body defines a rim extending inwardly from the pocket. The power tool also includes a second isolator. The pocket of the body is adapted for receiving at least a portion of the second isolator. The rim separates the first isolator from the second isolator.

According to another aspect of the invention, the first isolator has a generally cylindrical shape.

According to another aspect of the invention, the housing defines a boss having an opening therein for receiving at least a portion of the first fastener.

According to another aspect of the invention, the first isolator defines an opening the isolation and the boss is positioned at least partially in the opening of the first isolator.

According to another aspect of the invention, the isolator is spaced from the boss.

According to another aspect of the invention, the body defines a rim extending inwardly from the pocket. The power tool also includes a second isolator defining an opening through the isolator. The pocket of the body is adapted for receiving at least a portion of the second isolator. The rim separates the first isolator from the second isolator.

According to another aspect of the invention, the first isolator and the second isolator have generally cylindrical shapes. The cylindrical outer peripheries of the first isolator and the second isolator closely conform to the pocket of the body. The outer periphery of the boss is generally cylindrical and the openings of the first isolator and the second isolator are adapted to receive the outer periphery of the boss.

According to another aspect of the invention, the outer periphery of the boss is spaced from the first isolator and the second isolator.

According to another aspect of the invention, the housing includes a first component and a second component connected to the first portion by the first fastener.

According to another aspect of the invention, the first component defines a first planar surface. The second component defines a first planar surface and the first component and the second component are connected at the planar surfaces.

According to another aspect of the invention, the power tool also includes a motor connected to the housing.

According to another aspect of the invention, the motor is an electric motor.

According to another aspect of the invention, the motor is a pneumatic motor.

In another embodiment, a power tool is provided with a body and a housing surrounding at least a portion of the body. The power tool also includes a first isolator positioned between the body and the housing and in contact with the body and the housing. The power tool also includes a first fastener connected to the housing to position the first isolator with respect to the housing. The power tool also includes a second isolator positioned between the body and the housing and in contact with the body and the housing.

According to another aspect of the invention, the body defines a pocket for receiving at least a portion of the first isolator. The housing defines a boss having an opening therein for receiving at least a portion of the first fastener. The first isolator defines an opening and the second isolator defines an opening. The boss is positioned at least partially in the opening of the first isolator and at least partially in the opening of the second isolator.

According to another aspect of the invention, the body defines a rim extending inwardly from the pocket and the pocket of the body is adapted for receiving at least a portion of the second isolator.

According to another aspect of the invention, the body defines a rim extending inwardly from the pocket and the rim separates the first isolator from the second isolator.

According to another aspect of the invention, the first isolator and the second isolator have generally cylindrical shapes. The cylindrical outer peripheries of the first isolator and the second isolator closely conform to the pocket of the body. The outer periphery of the boss is generally cylindrical and the openings of the first isolator and the second isolator are adapted to receive the outer periphery of the boss.

In yet another embodiment, a power tool is provided with a body defining a first pocket and a spaced apart second pocket. The power tool also includes a housing surrounding at least a portion of the body and a first isolator positioned between the body and the housing and in contact with the body and the housing. The first pocket of the body receives at least a portion of the first isolator. The first isolator defines an opening through the first isolator. The power tool also includes a second isolator positioned between the body and the housing and in contact with the body and the housing. The second pocket of the body receives at least a portion of the second isolator. The second isolator defines an opening through the second isolator.

The power tool also includes a first fastener connected to the housing to position the first isolator with respect to the housing. At least a portion of the first fastener is positioned in the opening of the first isolator. The power tool also includes a second fastener connected to the housing to position the second isolator with respect to the housing. At least a portion of the second fastener is positioned in the opening of the second isolator.

According to another aspect of the invention, the first isolator and the second isolator have generally cylindrical shapes. The cylindrical outer peripheries of the first isolator and the second isolator closely conform to the first pocket of the body and to the second pocket of the body, respectively.

According to another aspect of the invention, the housing defines a first boss having an opening therein for receiving at least a portion of the first fastener; at least a portion of the first boss is positioned in the opening of the first isolator. The housing defines a second boss having an opening therein for receiving at least a portion of the second fastener. At least a portion of the second boss is positioned in the opening of the second isolator.

According to another aspect of the invention, the first isolator and the second isolator have generally cylindrical shapes. The cylindrical outer peripheries of the first isolator and the second isolator closely conform to the first pocket of the body and to the second pocket of the body, respectively. The outer periphery of the first boss is generally cylindrical and the openings of the first isolator and the second isolator are adapted to receive the outer periphery of the first boss and the outer periphery of the second boss, respectively.

The technical advantages of the present invention include the ability to use the same dampeners in multiple locations. For example, according to an aspect of the present invention a power tool is provided including a body and a housing surrounding at least a portion of the body. A first isolator is positioned between the body and the housing. The first isolator is in contact with the body and the housing. The power tool also includes a first fastener connected to the housing to position first isolator with respect to the housing.

The power tool also includes a second isolator positioned between the body and the housing in contact with the body and the housing. The power tool also includes a second fastener connected to the housing to position the second isolator with respect to the housing. The first isolator and the second isolator may have substantially the same dimensions. When the first isolator and second isolator have substantially the same dimensions, these same dampeners may be utilized in multiple locations. Thus, the present invention provides for use of the same dampeners in multiple locations.

The technical advantages of the present invention further include the ability to provide for very easy assembly. For example, according to an aspect of the present invention a power tool is provided including a body and a housing surrounding at least a portion of the body. A first isolator is positioned between the body and the housing and is in contact with the body and the housing. A first fastener is attached to the housing to position the first isolator with respect to the housing.

For example the dampeners can be put in position while the two handle housing halves or clam shells are open. Later the clam shells may be closed around the housing. Further, the proposed dampeners or isolators may all have an identical cylindrical shape to allow for a very cost effective design. Thus, the present invention provides for a very easy assembly of a power tool.

The technical advantages of the present invention further include the ability to provide isolators with different stiffness to optimize vibration reduction. For example, according to another aspect of the present invention a power tool is provided including a housing, a body, a first isolator and a first fastener. The housing is surrounded by at least a portion of the body and the first isolator is positioned between the body and the housing and in contact with the body and the housing. The first fastener is connected to the housing to position the first isolator with respect to the housing.

The power tool also includes a second isolator positioned between the body and the housing and in contact with the body and the housing as well as a second fastener connected to the housing to position the second isolator with respect to the housing. The first isolator and the second isolator are made of resilient, compressible materials. The first isolator has a first isolator stiffness and the second isolator has a second isolator stiffness. The first isolator stiffness is substantially different from the second isolator stiffness. For example, the upper dampeners and the lower dampener elements may have different stiffness to allow for an optimal reduction of vibration levels that are transferred to the user's hand. Thus, the present invention provides for isolators with different stiffness to optimize vibration reduction.

The technical advantages of the present invention further include the ability to provide a safety feature against separation of the handle from the motor housing. For example, according to an aspect of the present invention, a power tool is provided including a housing, a body, first and second isolators, and first and second fasteners. The housing includes a boss with a longitudinal opening for receiving a fastener. The boss is positioned at least partially in the opening of the first isolator. The body has a rim extending inwardly from the boss. The power tool also includes a second isolator and the pocket is adapted to receive at least a portion of the second isolator. The first and second isolators may have a generally cylindrical shape and the peripheries of the isolators closely conform to the pocket of the bodies. The outer periphery of the boss is cylindrical and the openings of the isolators are adapted to receive the outer peripheries of the boss. The bosses and the fasteners cooperate with the pockets of the body to provide a safety feature against separation of the handle from the motor housing. The screw bosses go through the center of the cylindrical isolators. The screw bosses provide a safety feature against separation of the handle from the motor housing. The safety elements provide a safe connection between the handle and the motor housing. Thus, the present invention provides for a safety feature against separation of the handle from the motor housing.

The technical advantages of the present invention further include the ability to isolate and absorb vibration under the compression condition. For example, according to another aspect of the present invention a power tool including a body, a housing, a first isolator, and a first fastener are provided. The first isolator defines an opening in the isolator and the housing defines a boss having an opening for positioning the first fastener. The body defines a body boss defining a pocket in the boss to receive the first isolator. A rim extends from the boss. The power tool also includes a second isolator defining an opening. The pocket of the body boss is adapted to receive the second isolator. The first isolator and the second isolator have cylindrical shapes and the peripheries of the isolators closely conform to the pocket. The outer periphery of the boss is generally cylindrical and the openings of the first and second isolator are adapted to receive the peripheries of the boss. The isolators are closely conformed to the boss. By providing the isolators in closely conformance to the bosses, the cylindrical isolator isolates and absorbs vibration under compression conditions. Thus, the present invention provides for ability to isolate and absorb vibrations under a compression condition.

The technical advantages of the present invention include the ability to isolate and absorb vibrations under shear conditions. For example, according to another aspect of the present invention a power tool is provided including a housing having screw bosses that go through the center of cylindrical isolators. The screw bosses provide a safety feature against separation of body from the housing. The cylindrical dampener elements bottom onto a rim of the boss of the body and an interior wall of the handle housing. The configuration will allow the cylindrical dampener elements to isolate and absorb vibrations under shear conditions. Thus the present invention provides for the ability to isolate and absorb vibrations under shear conditions.

The technical advantages of the present invention further include the ability to provide a simple cost effective vibration isolator that may comply with government regulations. For example, according to another aspect of the present invention a power tool is provided with a cylindrical dampener element that is captured between the tool body and the housing of the power tool. Thus the present invention provides for a simple cost effective means of isolating vibrations in a power tool.

These and other objects of the invention will become apparent upon consideration of the following written description taken together with the accompanying figures.

BRIEF DESCRIPTION OF THE DRAWINGS

The accompanying drawings illustrate various embodiments of the present invention and together with a description serve to explain the principles of the invention. In the drawings.

Corresponding reference characters indicate corresponding parts throughout the several views. Like reference characters tend to indicate like parts throughout the several views.

DETAIL DESCRIPTION OF THE INVENTION

Figure 1:
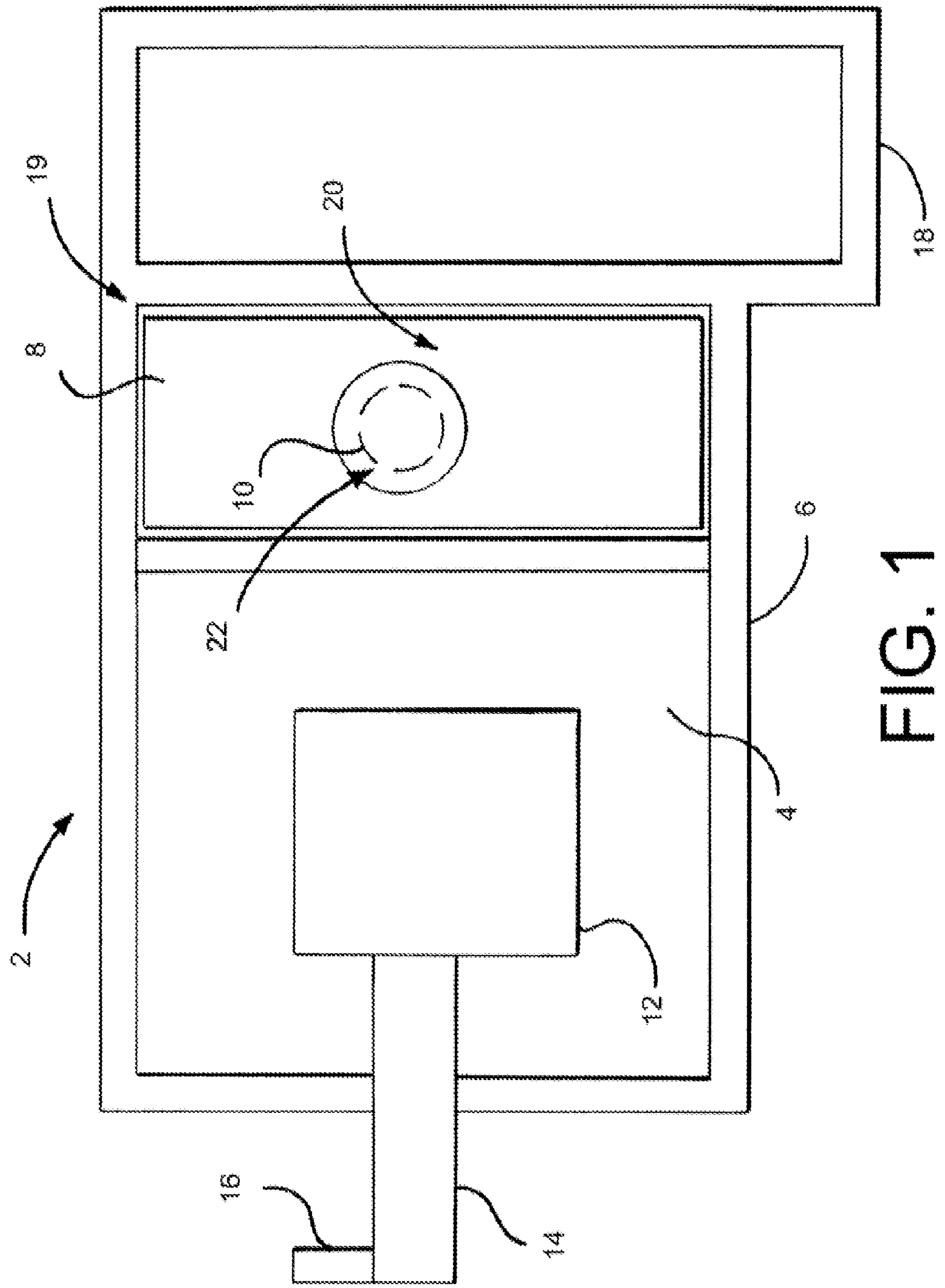
FIG. 1 is a plan view, partially in cross section of a power tool with a vibration isolator according to an embodiment of the present invention.

Reference will now be made in detail to various presently preferred embodiments of the invention, examples of which are illustrated in the accompanying drawings. In the various FIGS. some of the structures are referenced with similar reference numerals.

According to the present invention and referring now to FIG. 1, a power tool 2 is shown. The power tool 2 includes a body 4 and a housing 6 surrounding at least a portion of the body 4. The power tool 2 also includes a first isolator 8 which, as is shown in FIG. 1, is positioned between the body 4 and the housing 6. The first isolator 8 is in contact with the body 4 and the housing 6. The power tool 2 also includes a first fastener 10 connected to the housing 6 to position the first isolator 8 with respect to the housing 6.

As shown in FIG. 1, the power tool 2 may be any power tool that generates vibration or powers a tool may cause vibration to the power tool 2. The power tool 2 may be driven by for example motor 12. The motor 12 is supported by body 4. The motor 12 may include an output shaft 14 to which a cutting tool 16 may be attached. The output shaft 14 may rotate or the output shaft 14 may oscillate or move in any direction that assists in moving cutting tool 16. The motor 12 may be an electric motor, a pneumatic motor or may be a gasoline or other power source motor.

The power tool 2 may, as is shown in FIG. 1, include a handle 18 for gripping by the user of the power tool 2. The handle 18 may be integral with the housing 6 as shown in FIG. 1, or the handle 18 may be a separate component connected to the housing 6.

The power tool 2, as is shown in FIG. 1, may include a housing connection portion 19 which may be a portion of the body 4. The housing connection portion 19 may be integral with the body 4 or may be a separate component secured to the body 4. The housing connection portion 19, as is shown in FIG. 1, may define pocket 20 for at least partially receiving the first isolator 8. The pocket 20 and the isolator 8 may have any suitable shape. The periphery of the isolator may be shaped to mate with the pocket 20. For example, the circumference of the isolator 8 and the mating portion of the pocket may have round or polygonal shape wherein round can be circular, oval, or any other arcuate shape. The circumference of the isolator 8 and the mating portion of the pocket may, alternatively be polygonal, for example, it can be triangular, square, pentagonal, hexagonal, octagonal or any other polygonal shape. For example and as is shown in FIG. 1, the pocket 20 may have a generally rectangular shape. The pocket 20 may be sized to provide a secure fit with the isolator 8. The isolator 8 may be in interference with or compressed to the pocket 20 when in position in pocket 20.

The first isolator 8 may include a transverse opening 22 for receiving first fastener 10. The opening 22 may provide clearance for the first fastener 10 or may be interferencely fitted to the first fastener 10.

Figure 2:
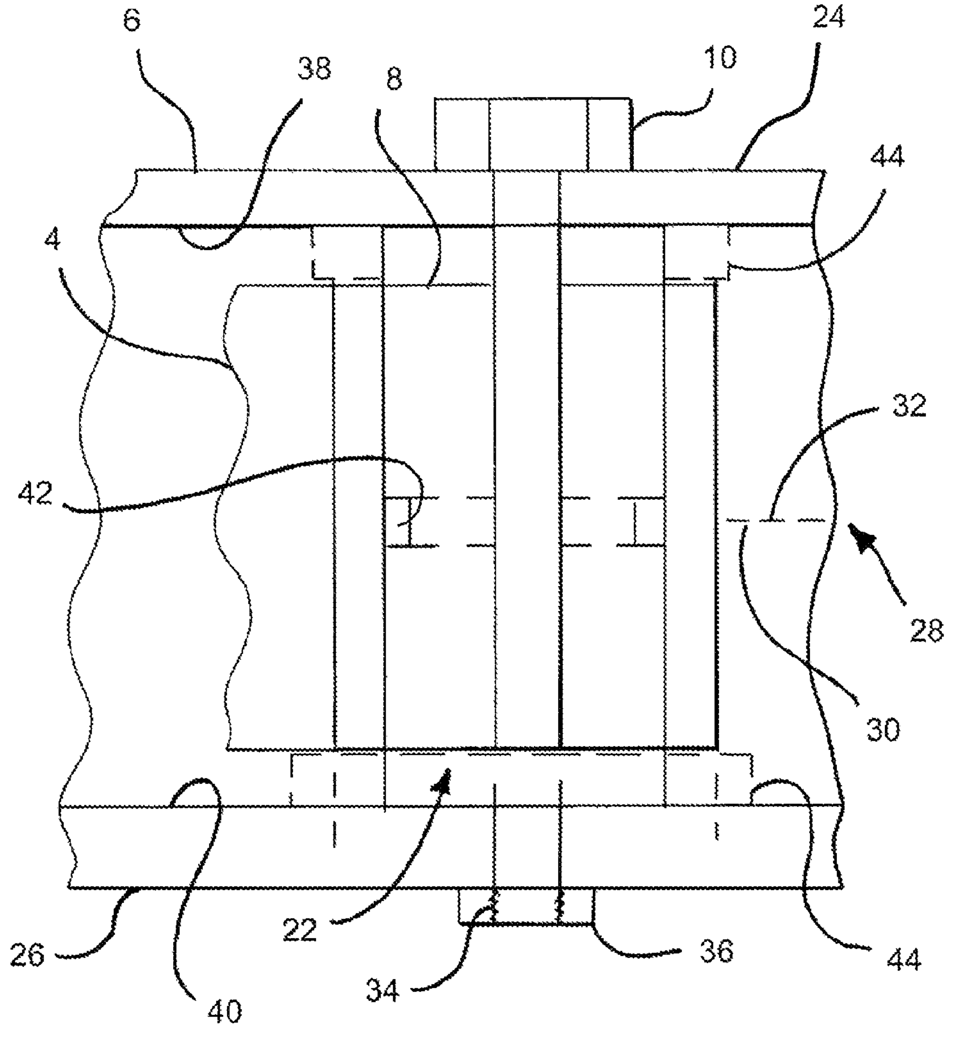
FIG. 2 is a cross sectional view of the power tool of FIG. 1 along the line 2-2 in the direction of the arrows.

Referring now to FIG. 2, the housing 6 may be integral. However, and as shown in FIG. 2, the housing 6 may include a first housing portion 24 and a second housing portion 26. The first housing portion 24 and the second housing portion 26 may be connected at, for example, split line 28. The split line 28 may include a first housing parallel face 30 and an opposed housing portion planar face 32.

By providing the first housing portion 24 and the second housing portion 26, the components of the power tool 2 may be easily assembled into the housing 6. For example, the first isolator 8 may be easily positioned in the housing 6 so that first fastener 10 may be utilized to position the first isolator 8. It should be appreciated that the first fastener 10 may be utilized not only to secure the first isolator 8, but also to secure the first housing portion 24 to the second housing portion 26. The first fastener 10 may include external thread 34 which mates with the housing 6. Alternatively, the first fastener 10 may cooperate with a nut 36. The nut 36 may be threadably engaged with the thread 34 of the first fastener 10. The first isolator 8 as shown in FIG. 2 may extend from first inside housing face 38 of the first housing portion 24 to opposed second inside housing face 40 of second housing portion 26. It should be appreciated the first isolator 8 may matingly fit in the housing 6, be in clearance with the housing 6, or may interferencely fit in the housing 6.

As shown in FIG. 2, the first isolator 8 may have a uniform rectangular cross section. It should be appreciated, however, that the first isolator 8 may include a centering arrangement 42 in the form of a central rib or rim extending from the body 4 of the power tool 2. The rim 42 may serve to properly position the body 4 within the housing 6 such that the body 4 is spaced from the housing 6. It should be appreciated that, alternatively and as shown in hidden lines, the first isolator 8 may include opposed shoulders 44 for cooperation with the body 4. The shoulders 44 of the isolator 8 serve to centrally position the body 4 within the housing 6 such that the body 4 is spaced from the housing 6.

Figure 3:
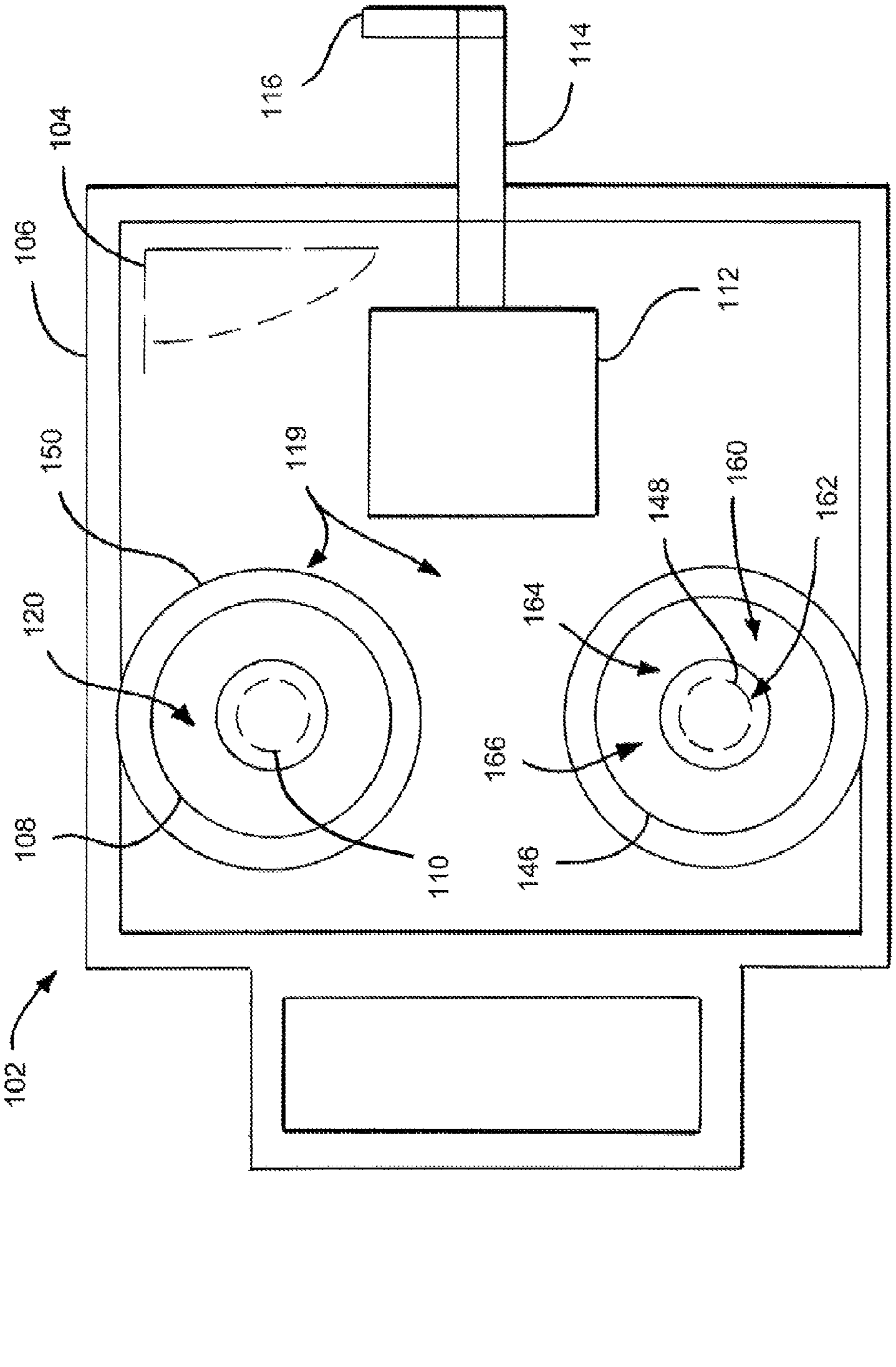
FIG. 3 is a plan view, partially in cross section of a power tool with a vibration isolator according to another embodiment of the present invention.
Figure 4:
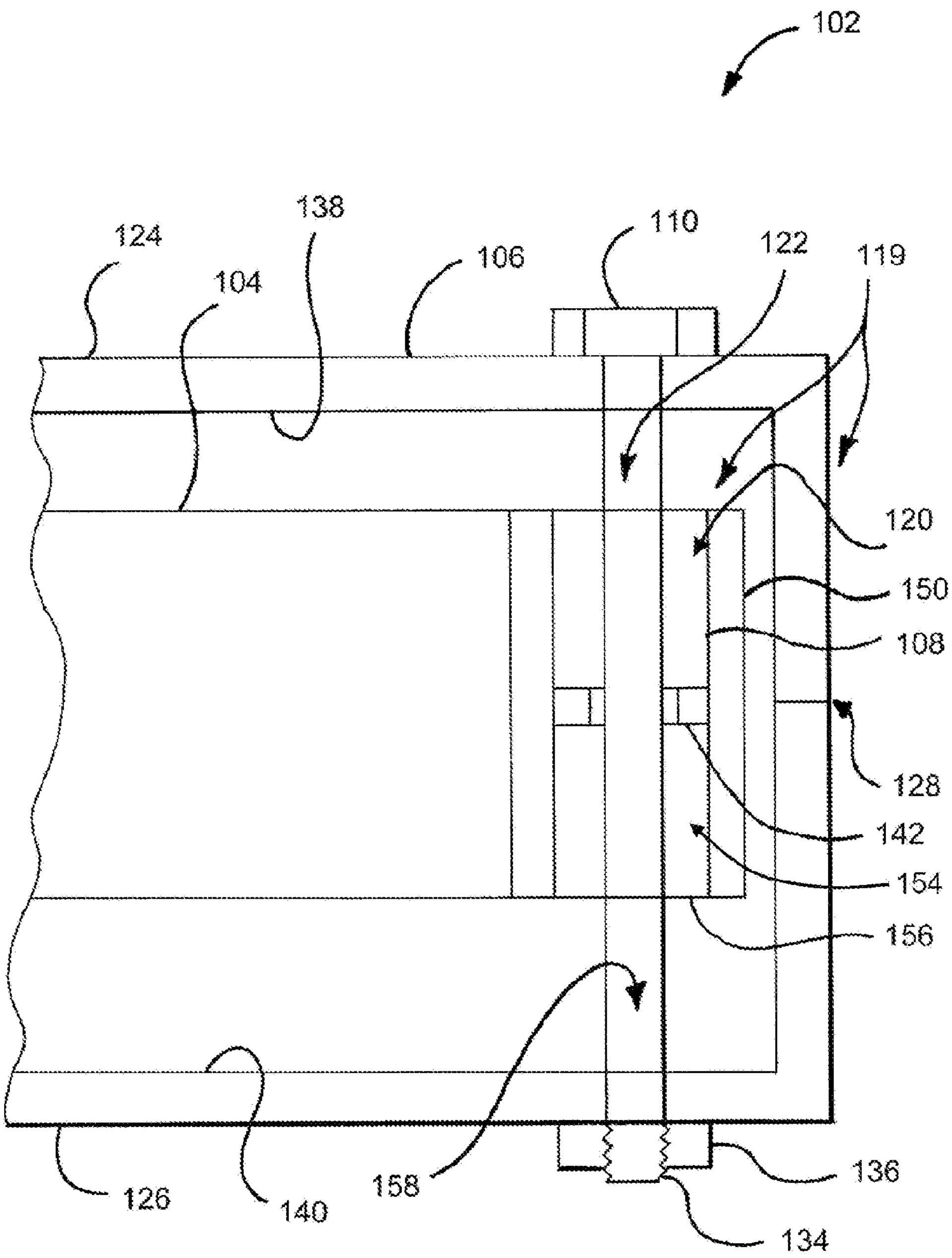
FIG. 4 is a cross sectional view of the power tool of FIG. 3 along the line 4-4 in the direction of the arrows.

According to the present invention and referring now to FIGS. 3 and 4, another embodiment of the present invention is shown as power tool 102. The power tool 102 is similar to the power tool 2 of FIGS. 1 and 2, except it includes a vibration isolating configuration that is somewhat different. For example and as shown in FIG. 3, the power tool 102 includes a body 104. The body 104 may be utilized to support, for example, motor 112. The motor 112 may include a motor shaft 114 for supporting the oscillation or rotation of cutting tool 116. The body 104 is surrounded, at least in a portion, by housing 106. A first isolator 108 is positioned between the body 104 and the housing 106. The first isolator 108 is in contact with the body 104 and the housing 106. A first fastener 110 is connected to the housing 106 to position the first isolator 108 with respect to the housing 106.

The power tool 102 may, as is shown in FIG. 3, further include a second isolator 146. The second isolator 146 is, likewise, positioned between the body 104 and the housing 106. The second isolator 146 is, likewise, in contact with the body 104 and the housing 106. A second fastener 148 that may be similar to the first fastener 110 is connected to the housing 106 and the body 104. The second fastener 148 is utilized to position the second isolator 146 with respect to the housing 106.

Similarly to the power tool 2 of FIGS. 1 and 2 and as shown in FIG. 4, the power tool 102 may include a first housing portion 124 and a second housing portion 126. While it should be appreciated that the first isolator 108 may be configured such that the first isolator 108 extends from first housing portion 124 to second housing portion 126. However, and as shown in FIG. 4, the first isolator 108 may not extend from the first housing portion 124 to the second housing portion 126. This configuration of the first isolator permits the body 104 to be properly positioned spaced from the housing 106.

As shown in FIG. 4, the body 104 may include a housing connection portion 119 which includes a first boss 150. The first boss 150 defines first pocket 120 in the first boss 150. The first pocket 120 is adapted for receiving at least a portion of the first isolator 108.

The first pocket 120 may be adapted to closely conform to the first isolator 108. The first isolator 108 may have any suitable shape and may for simplicity have a generally cylindrical shape. Likewise, the first pocket 120 may similarly have a cylindrical shape to closely conform to the first isolator 108.

The body 104, as shown in FIG. 4, may further include a second pocket 154 that may be formed in a first boss 150 of housing connector portion 119 of the body 104. The second pocket 154 may receive at least a portion for example third isolator 156.

As shown in FIG. 4, the body 104 may further include a rim 142 extending inwardly from the first boss 150. The rim 142 serves to partially separate the first pocket 120 from the second pocket 154. As shown in FIG. 4, the first isolator 108 is fitted between rim 142 and first inside surface 138 of first housing portion 142. Similarly the third isolator 156 is positioned between rim 142 and second inside surface 140 of second housing portion 126.

As shown in FIG. 4, the first housing portion 124 is connected to the second housing portion 126 along split line 128. It should be appreciated that as shown in FIG. 4, the split line 128 may be a planar surface. It should be appreciated however that the split line may have any shape provided that the first housing portion 124 generally contacts the second housing portion 126 to provide the housing 106.

As shown in FIG. 4, the first fastener 110 may be utilized to secure first housing portion 124 to second housing portion 126. The first fastener 110 may include external threads 134 that either mate with housing 106 or, as is shown in FIG. 4, with nut 136. The first isolator 108 may, as is shown in FIG. 4, include a longitudinal opening 122 for receiving the first fastener 110. Similarly the third isolator 156 may include a longitudinal opening 158 for receiving the first fastener 110.

Referring again to FIG. 3, the power tool 102 may have a configuration adjacent the second fastener 148 that is similar to the configuration for first fastener 110. As shown in FIG. 3, the power tool 102 may further include a fourth isolator 160 which is similar to the second isolator 146. The fourth isolator 160 may include a longitudinal opening 162 for receiving second fastener 148. The fourth isolator 160 may be fitted into for example fourth pocket 164 while the second isolator 146 may be fitted into third pocket 166. The third pocket 166 and the fourth pocket 164 may be formed in, for example, body 104.

The first isolator 108, the second isolator 146, the third isolator 156 and the fourth isolator 160 may have any suitable shape and may all, for example, have a generally cylindrical shape. The isolators 108, 146, 156 and 160 may all have a longitudinal opening for receiving the respective fasteners and may all be of the same size and shape such that each of the isolators is interchangeable with each other.

The isolators may be made of identical materials with identical mechanical properties. It should be appreciated however, that to minimize vibration and to avoid harmonic resonance it may be desirable to provide the isolators with some of the isolators having different stiffnesses or different mechanical properties. The different properties may be used even if the isolators have identical shapes. For example, it may be that the lower isolators, for example, second isolator 146 and fourth isolator 160 may have a stiffer or a weaker isolator such as to minimize vibration in the power tool 102. Such selections of the materials for the isolators may be experimentally or empirically derived.

Figure 5:
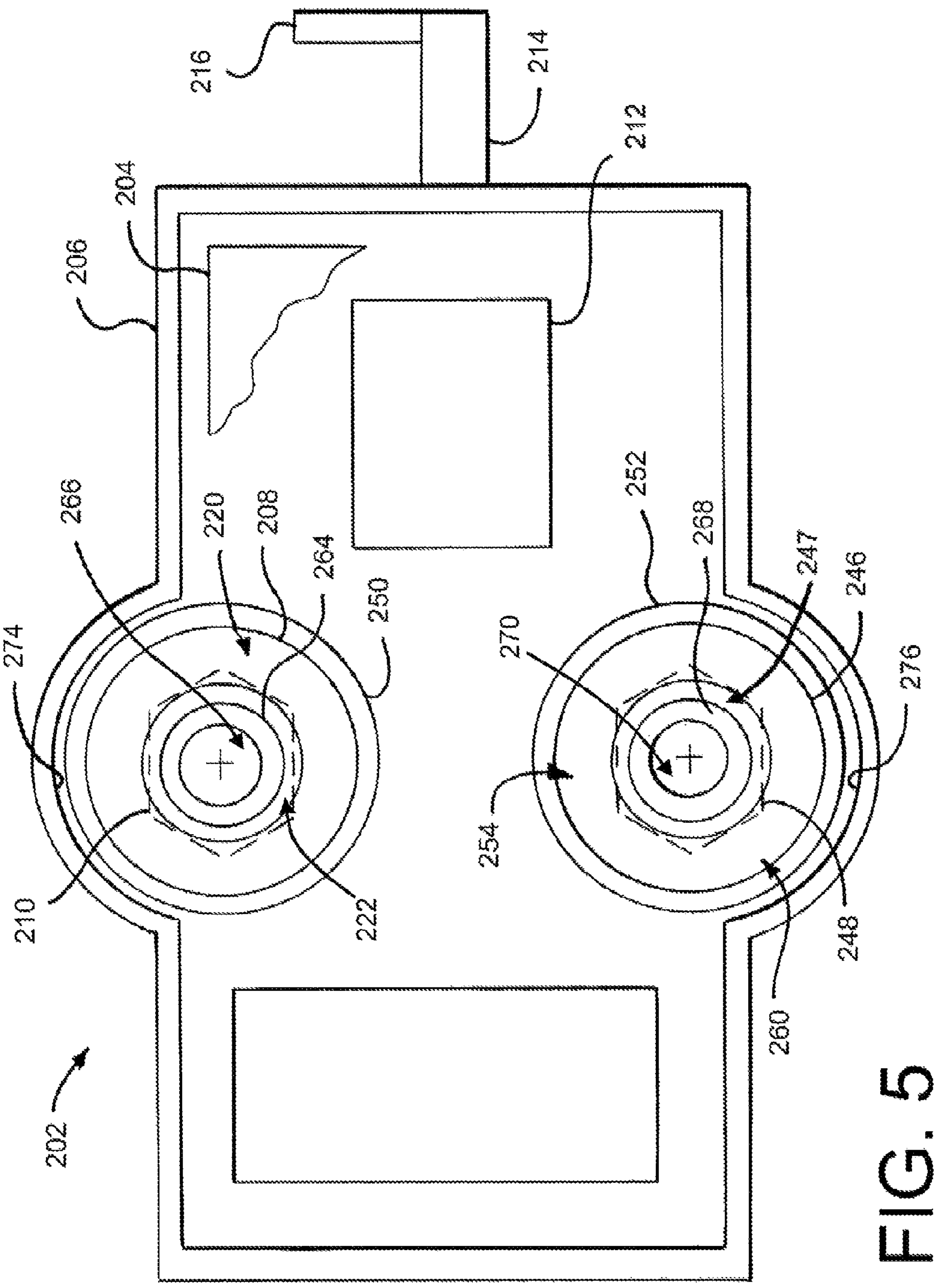
FIG. 5 is a plan view, partially in cross section of a power tool with a vibration isolator according to an embodiment of the present invention.
Figure 6:
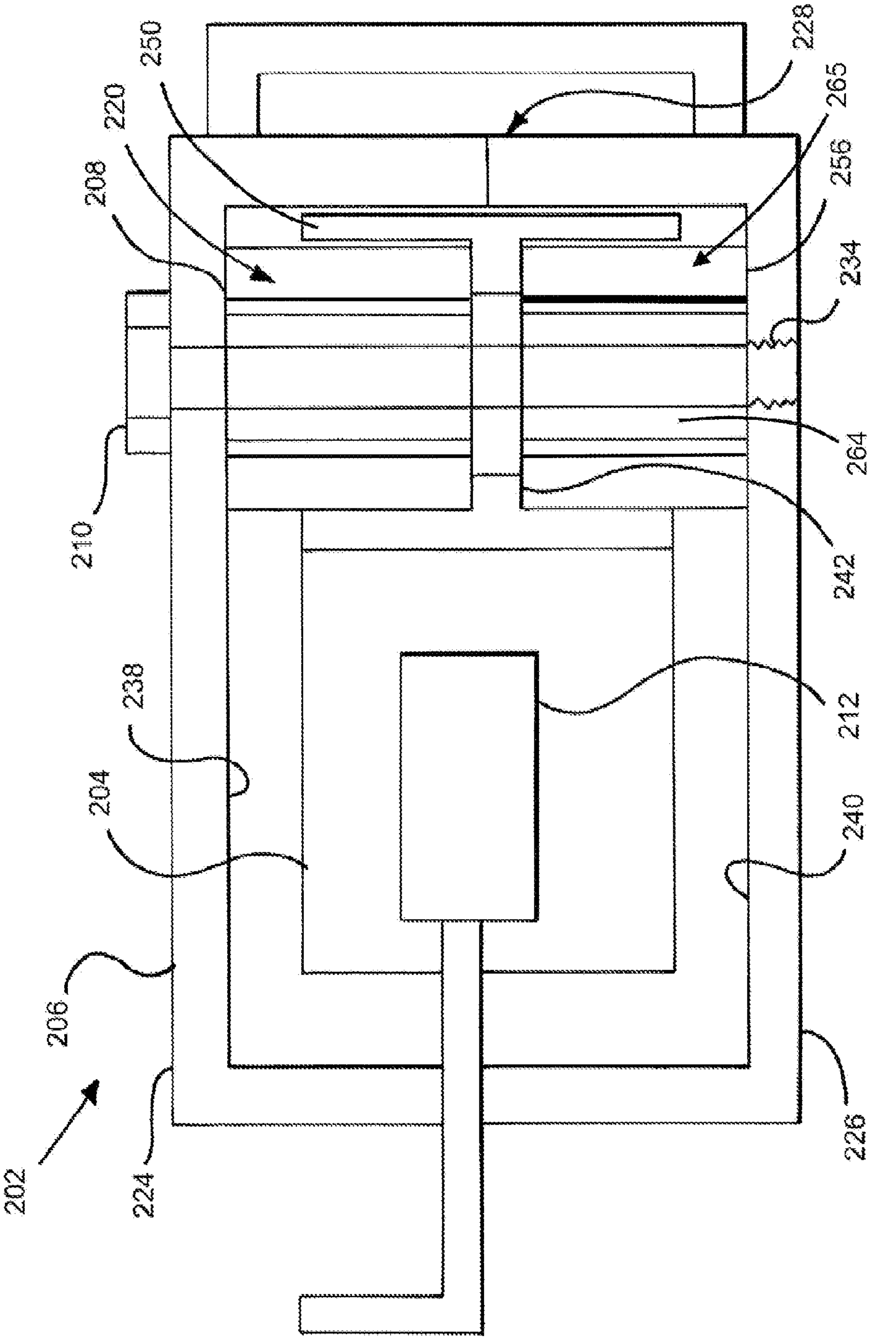
FIG. 6 is a cross sectional view of the power tool of FIG. 5 along the line 6-6 in the direction of the arrows.
Figure 7:
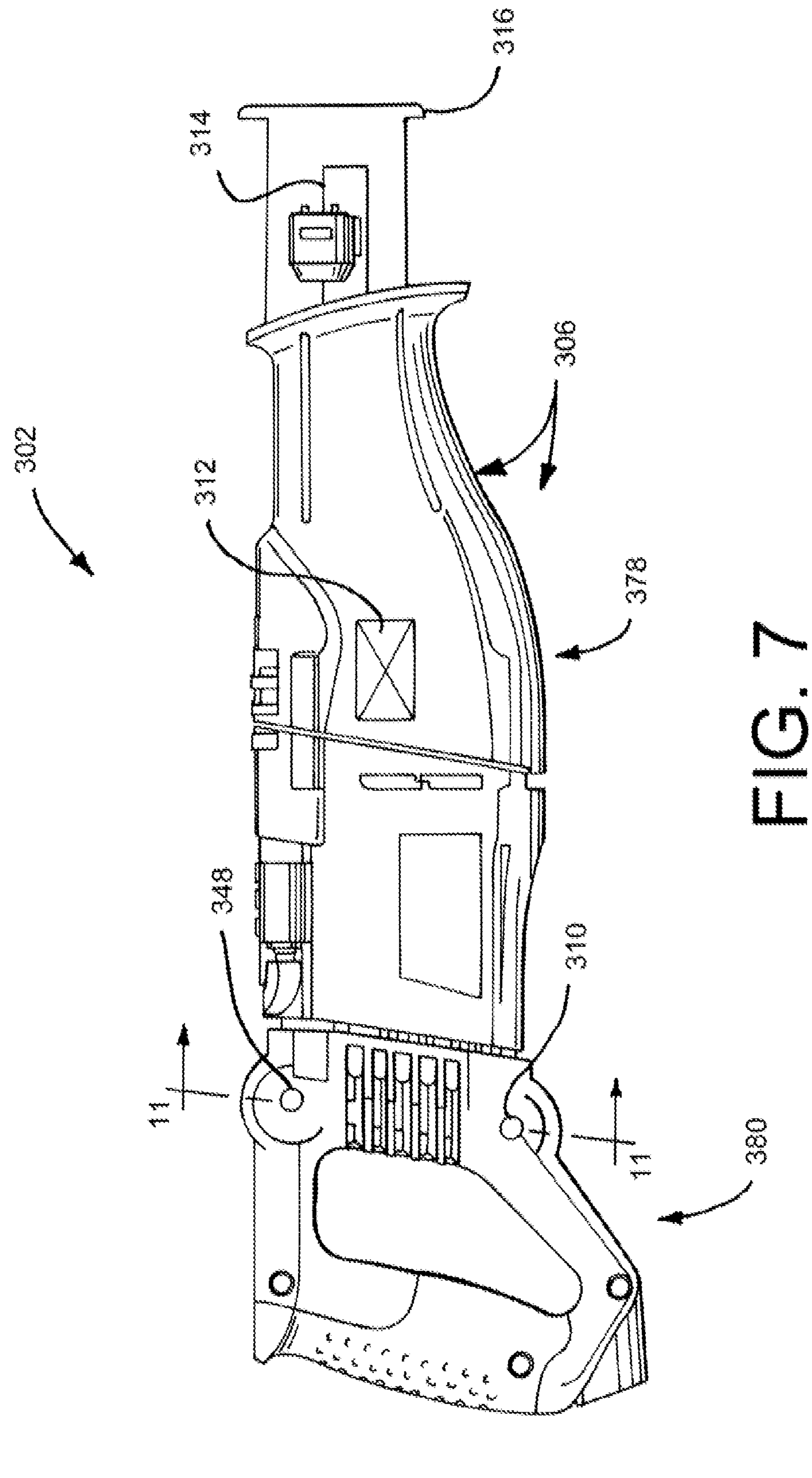
FIG. 7 is a plan view of a power tool with a vibration isolator according to yet another embodiment of the present invention.
Figure 7A:
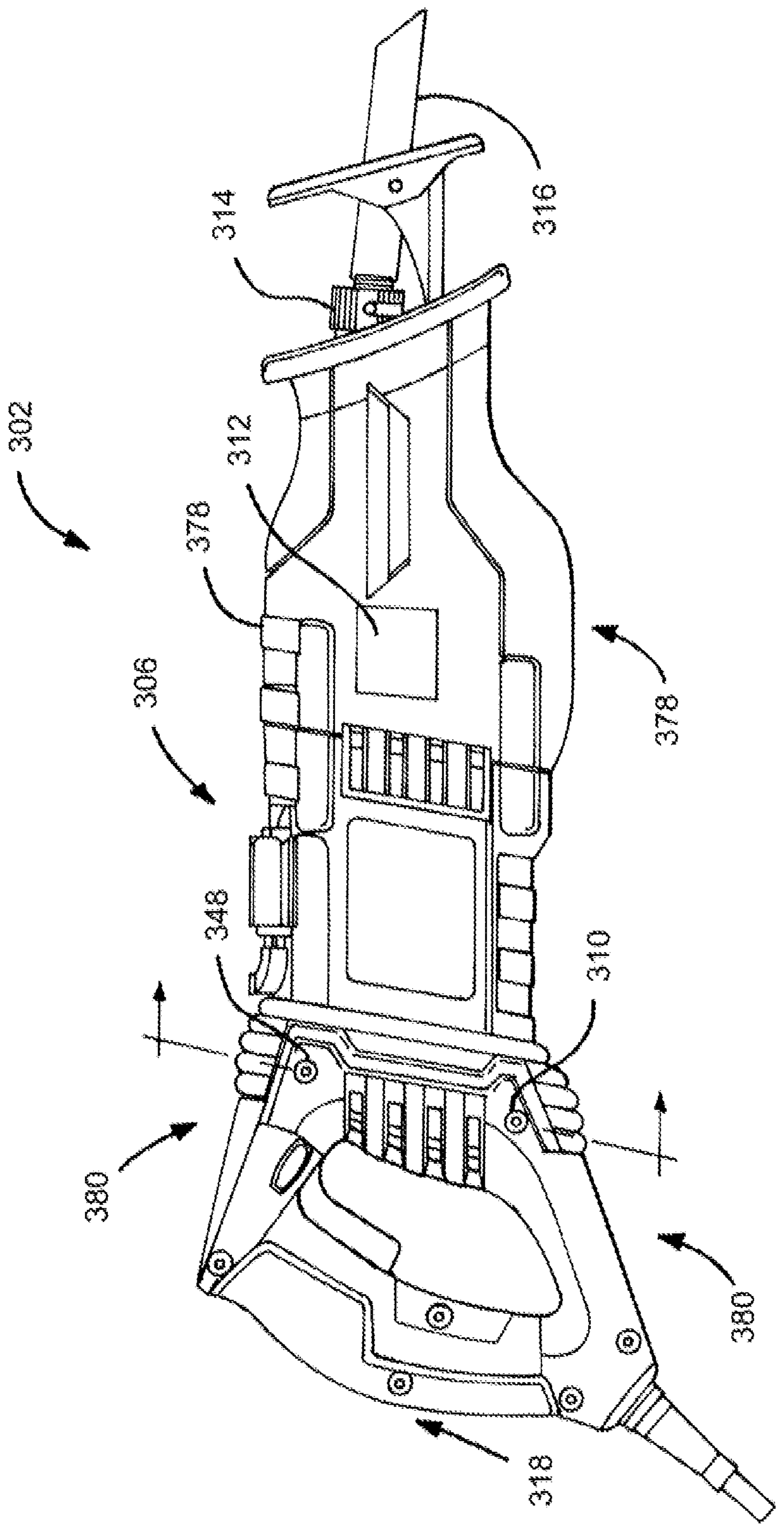
FIG. 7A is another plan view of the power tool of FIG. 7.
Figure 8:
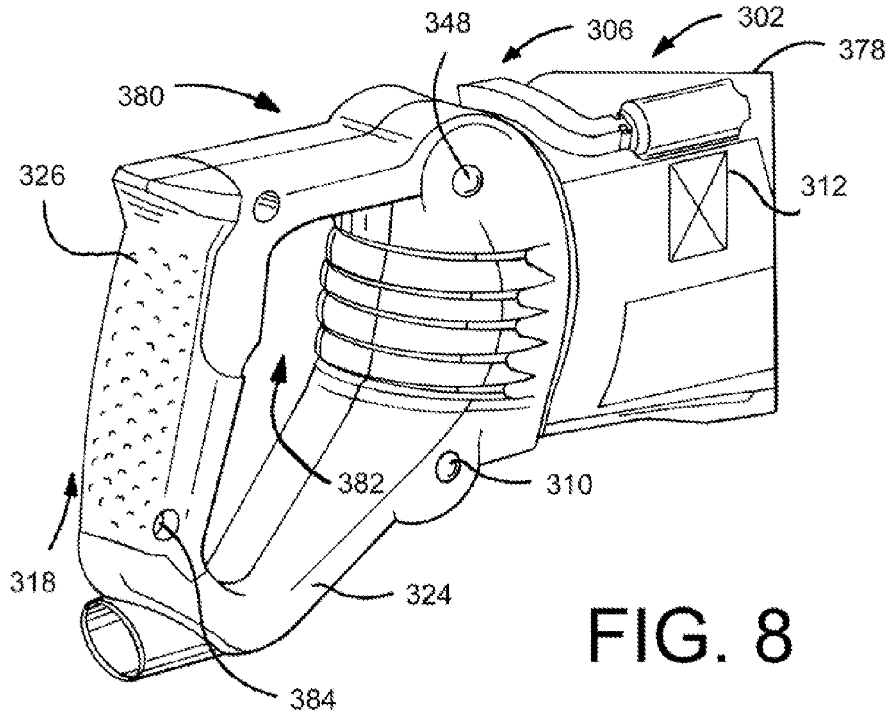
FIG. 8 is a partial perspective view of the power tool of FIG. 7 with a vibration isolator showing the handle in greater detail.
Figure 8A:
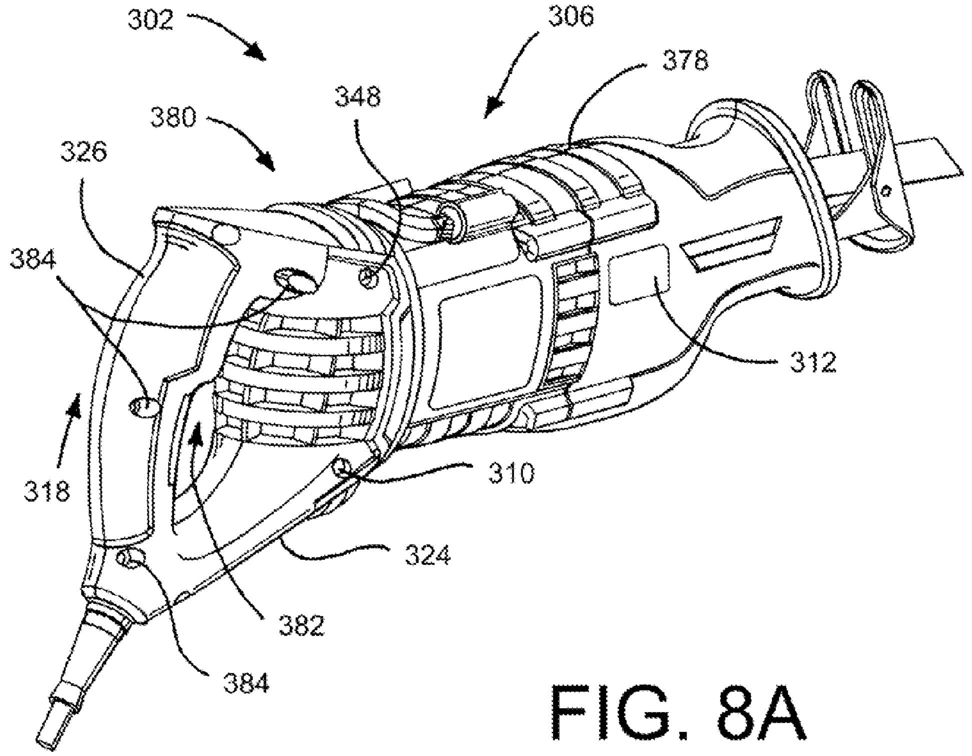
FIG. 8A is another partial perspective view of the power tool of FIG. 7.

Referring now to FIGS. 5 and 6, yet another embodiment of the present invention is shown as power tool 202. The power tool 202 is similar to the power tool 102 except that the power tool 202 includes supports or housing bosses surrounding the fasteners.

For example, and referring now to FIG. 5, the power tool 202 includes a body 204 and a housing 206 surrounding a portion of the body 204. The power tool 202 also includes a first isolator 208 positioned between the body 204 and the housing 206. The isolator 208 is in contact with the body 204 and the housing 206. The power tool 202 as shown in FIG. 5 further includes a first fastener 210 for connecting the housing 206 to position the first isolator 208 with respect to the housing 206.

As shown in FIG. 5, the power tool 202 further includes a second isolator 246 positioned between the body 204 and the housing 206. The second isolator 246 is in contact with the body 204 and the housing 206. The power tool 202 further includes a second fastener 248 which is connected to the housing 206 to position the second isolator 246 with respect to the housing 206.

As shown in FIG. 5, the first isolator 208 and the second isolator 246 may have any suitable shape and may, as is shown in FIG. 5, be generally cylindrical and hollow. The first isolator 208 and the second isolator 256 may have substantially the same shape.

The first isolator 208 and the second isolator 248 may be made of a resilient and/or compressible material. The first isolator 208 may have a first isolator stiffness and the second isolator 246 may have a second isolator stiffness that is different than the first isolator stiffness.

As shown in FIG. 5, the body 204 defines a first pocket 220 for receiving at least a portion of the first isolator 208. The first pocket 220 may be formed from, for example, a portion of first body boss 250 of the body 204. Similarly, the body 204 may define a second pocket 254 for receiving at least a portion of the second isolator 246. The second pocket 254 may be formed from a portion of second body boss 252 formed from the body 204. The first pocket 220 and the second pocket 254 may be generally cylindrical to closely conform to the isolators.

As shown in FIG. 6, the body 204 may include a rim 242 extending inwardly from the first body boss 250. The power tool 202 may further include a third isolator 256. The first pocket 220 of the first body boss 250 may be adapted for receiving a portion of the first isolator 208. The first body boss 250 further defines a third pocket 265 for receiving the third isolator 256. The rim 242 may be utilized to separate the first isolator 208 from the third isolator 256.

Referring again to FIG. 5, the housing 206 may further define a first housing boss 264. The first housing boss 264 has an opening 266 in the boss 264 for receiving at least a portion of the first fastener 210. Similarly the housing 206 may further define a second housing boss 268 having an opening 270 in the second housing boss 268. The opening 270 is utilized for receiving at least a portion of the second fastener 248.

The first isolator 208 defines a first isolator opening 222. The first isolator opening 222 is sized such that the first boss 264 is positioned at least partially in the opening 222 of the first isolator 208. The cross section of the opening 222 of the first isolator 208 and the periphery of the first boss 264 may have a round or polygonal shape, including a circular, oval or other arcuate shape. The cross section of the opening 222 of the first isolator 208 and the periphery of the first boss 264 may alternatively be polygonal. For example the cross section of the opening 222 of the first isolator 208 and the periphery of the first boss 264 may be triangular, square, pentagonal, hexagonal, octagonal or have any other polygonal shape.

Similarly, the second isolator 246 defines a second isolator opening 247 through the second isolator 246. The opening 247 is sized to fit in the boss 268 of the housing 206. It should be appreciated that the opening 247 of the second isolator 246 and the opening 222 of the first isolator 208 may be sized such that the isolators 208 and 246 are spaced from the respective bosses. For example, and referring to FIG. 5, the first housing boss 264 may be in clearance or interferencely fitted with the opening 222 of the first isolator 208. Providing the isolators in interference with the fasteners will assist in providing support for loading under compression.

The power tool 202 may be driven by for example motor 212 which may be an electric motor, a pneumatic motor or a fuel powered motor. The motor 212 may drive for example an outward shaft 214 for operating a cutting tool 216.

The first housing boss 264 cooperating with the first fastener 210 and the second housing boss 268 cooperating with the second fastener 248 provides for a safety connection between the housing 206 and the body 204 if the isolators deteriorate.

In addition to the cooperation of the isolators and the fasteners, as shown in FIG. 5, an additional safety relationship between the housing 206 and the body 204 may be provided. For example, the housing 206 defines a first interior wall 274 positioned spaced from the body boss 250. Similarly, a second interior wall 276 is positioned spaced from the second body boss 252. The first interior wall 274 and the second interior wall 276 of the housing 206 provide a restraint to limit the motion of the body 204 within the housing 206.

Referring now to FIG. 6 the housing 206 may be a clam shell or include two separate portions. For example, the housing 206 may include a first housing portion 224 and an opposed second housing portion 226. The first housing portion 224 may be connected to the second housing portion 226 along, for example, split line 228. The first fastener 210, as well as the second fastener 248, may be utilized to connect the first housing portion 224 and the second housing portion 226. The first fastener 210 may include external threads 234 that cooperate with the second housing portion 226. It should be appreciated that a nut (not shown) may be utilized to cooperate with the threads 334 of the first fastener 210.

While the first fastener 210 may cooperate with a solitary isolator, as shown in FIG. 6, the first fastener 210 may cooperate with third isolator 256 that has a shape similar to the first isolator 208 and may be separated from the first isolator 208 by rim 242. The third isolator 256 is positioned in third pocket 265 formed in first body boss 250. The third isolator 256 is further positioned between first body boss 250 and first housing boss 264.

The isolators may have any shape to conform to the pockets in the housing boss. The circumference of the isolators and the pockets may be round or have a polygonal shape or any other suitable shape. For example the circumference of the isolators and the pockets may be for example, circular, oval or any arcuate shape. Alternatively the circumference of the isolators and the pockets may be polygonal, for example, triangular, square, pentagonal, hexagonal, octagonal or any other polygonal shape.

Rim 242 serves to center or properly position the housing 206 with respect to the body 204. It should be appreciated that the opposed faces of the first isolator 208 and the third isolator 256 may be in interference with the first wall 238 and the second wall 240, respectively, of the housing 206 and with the rim 242. It should also be appreciated that the outside surfaces of the first isolator 208 and the third isolator 256 may be in interference with the first body boss 250 and with the first housing boss 264.

Referring now to FIGS. 7 through 12 another embodiment of the present invention is shown as power tool 302. The power tool 302 is similar to the power tool 202 of FIGS. 5 and 6 except that the power tool 302 is a more refined design readily suited for commercialization. The power tool 302 includes a housing 306 which is different than the housing 206 of the power tool 202 of FIGS. 5 and 6. The housing 306 includes a motor housing 378 for containing motor 312 of the power tool 302. The housing 306 further includes a handle housing 380 which forms handle 318. The handle 318 defines handle opening 382 for assisting in holding the power tool 302 in a person's hand.

As shown in FIGS. 7, 7A, 8 and 8A, the handle housing 380 includes a first handle housing portion 324 and a second handle housing portion 326. The first handle housing portion 324 and the second handle housing portion 326 are joined together by, for example, a first fastener 310 in the form of a cap screw and a spaced apart second fastener 348 in the form of, for example, a cap screw. Additional fasteners 384 may be utilized to hold the first handle housing portion 324 to the second handle housing portion 326. The fasteners 310, 348 and 384 may be secured directly to second handle housing portion 326 by being threaded into the second handle housing portion 326 or additional fasteners in the form of nuts (not shown) may be utilized to secure the first handle housing portion 324 to the second handle housing portion 326.

Referring again to FIGS. 7 and 7A, the power tool 302 may include a shaft 314 extending from the motor 312 and driven thereby. Shaft 314 may rotate or oscillate tool 316 for performing work with the power tool 302.

Figure 9:
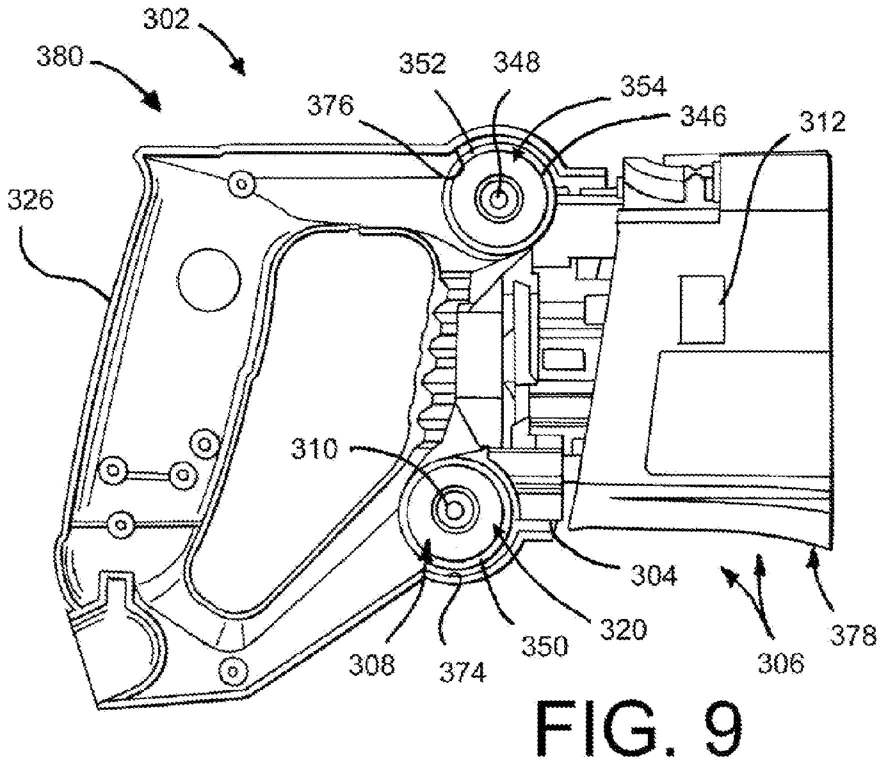
FIG. 9 is a partial perspective view of the power tool of FIG. 7 with one clam shell of the handle housing removed.
Figure 9A:
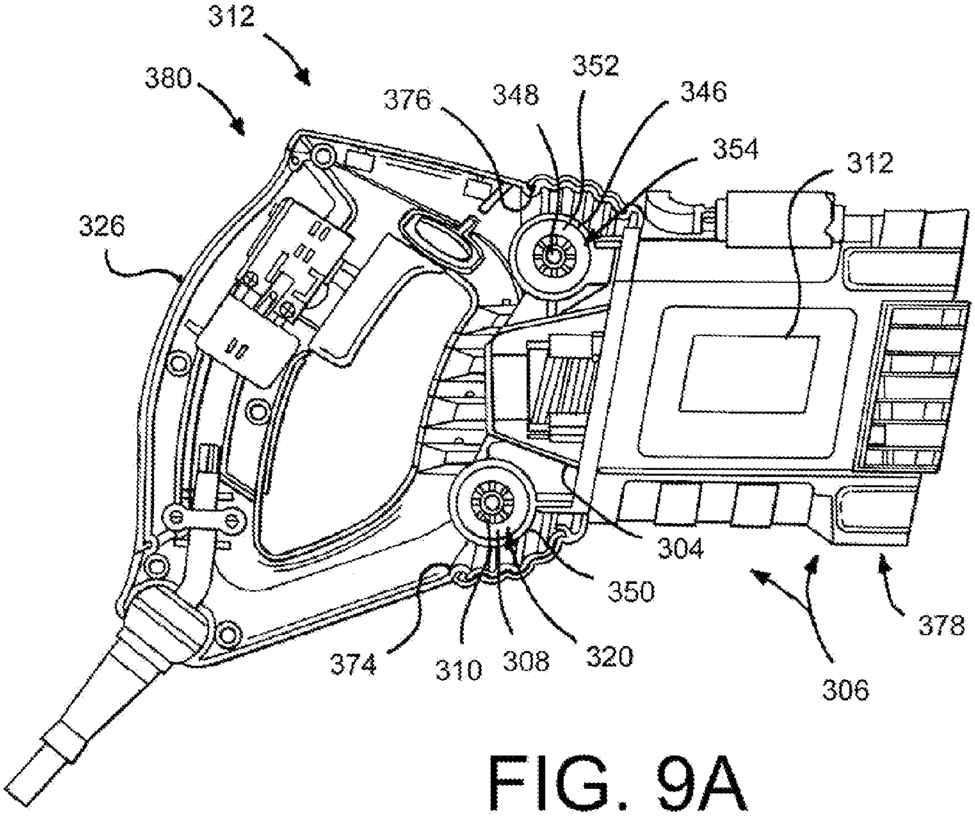
FIG. 9A is another partial perspective view of the power tool of FIG. 7 with one clam shell of the handle housing removed.

Referring now to FIGS. 9 and 9A, the power tool 302 includes body 304 and housing 306 which surrounds at least a portion of the body 304. The power tool 302 further includes a first isolator 308 that is positioned between the body 304 and the housing 306 and that is in contact with the body 304 and the housing 306. The power tool 302 further includes a first fastener 310, as shown in phantom. The first fastener 310 is connected to the housing 306 to position the first isolator 308 with respect to the housing 306.

The power tool 302 further includes a second isolator 346 positioned between the body 304 and the housing 306. The second isolator 346 is in contact with the body 304 and the housing 306. The power tool 302 further includes a second fastener 348 as shown in phantom. The second fastener 348 is connected to the housing 306 to position the second isolator 346 with respect to the housing 306.

The body 304, as shown in FIGS. 9 and 9A, includes a first body boss 350 defining a first pocket 320 in the first body boss 350. The first pocket 320 is adapted to receive at least a portion of the first isolator 308. The body 304 may further include a second body boss 352 defining a second pocket 354 for receiving at least a portion of the second isolator 346.

As shown in FIGS. 9 and 9A, the housing 306 defines a first interior wall 374 of the handle housing 380. The first interior wall 374 is positioned spaced from the first body boss 350. The handle housing 380 further defines a second interior wall 376. The second interior wall 376 is positioned spaced from the second body boss 352. The first interior wall 374 and the second interior wall 376 of the handle housing 380 provide a restraint to limit the motion of the body 304 within the housing 306.

The first isolator 308 and the second isolator 346 may have substantially the same dimensions. The first isolator 308 and the second isolator 346 may have any suitable shape and may be hollow cylinders. The first isolator 308 and the second isolator 346 may be made of any suitable durable material. The first isolator 308 may have a first isolator stiffness and the second isolator 346 may have a second isolator stiffness. The first isolator stiffness may be substantially different from the second isolator stiffness.

The isolators may be made of suitable durable material. The isolators may be made of a resilient compressible material. For example. the isolators may be made of a polymer. For example, the isolators may be made of a natural or a synthetic rubber.

Figure 10:
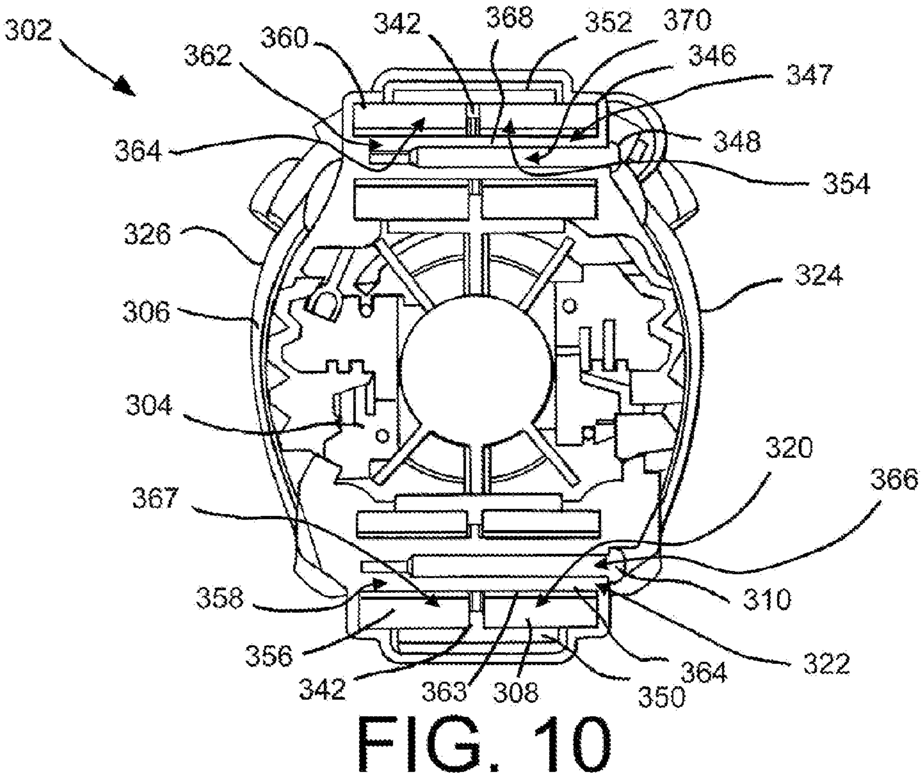
FIG. 10 is a cross sectional view of the power tool of FIG. 7 along the line 11-11 in the direction of the arrows.
Figure 10A:
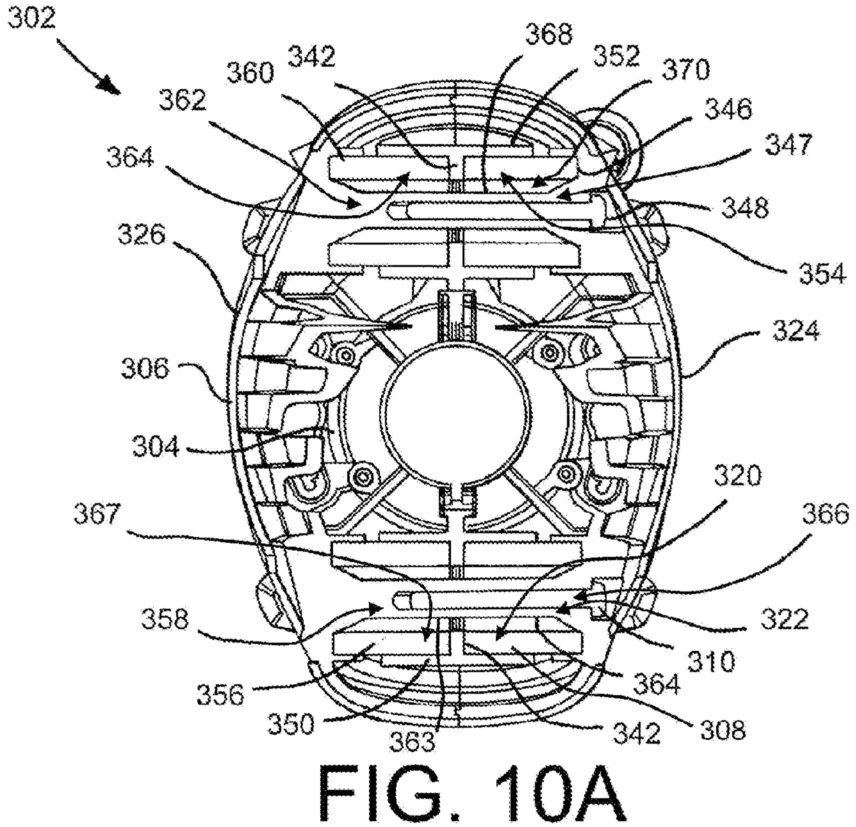
FIG. 10A is a cross sectional view of the power tool of FIG. 7A along the line 11A-11A in the direction of the arrows.

Referring now to FIGS. 10 and 10A, the body 304 of power tool 302 may define a rim 342 extending inwardly from first body boss 350. The power tool 302 may further include the second isolator 346. The power tool 302, as shown in FIGS. 10 and 10A, may further include third isolator 356. The first body boss 350 defines a third pocket 367. The third pocket 367 of the boss 350 may be adapted to receive at least a portion of the third isolator 356. The rim 342 of the first body boss 350 may be utilized to separate the first isolator 308 from the third isolator 356. The first fastener 310 as shown in FIGS. 10 and 10A is inserted into first isolator opening 322 of the first isolator 308 and then into third isolator opening 358 of the third isolator 356.

While it should be appreciated that the fasteners may be in direct contact with the isolators, to provide a more rigid structure and an additional safety feature, the housing 304 may define a first housing boss 364 having a first housing boss opening 366 in the first housing boss 364 for receiving the first fastener 310. The first housing boss 364, as shown in FIGS. 10 and 10A, is positioned, at least partially, in the first isolator opening 322 of the first isolator 308. The cross section of the housing boss openings of the isolators and the periphery of the housing bosses may have, for example, a round or polygonal shape. The round shape may include any arcuate shape including circular and oval. The polygonal shape may be triangular, square, pentagonal, hexagonal, and octagonal or any other polygonal shape.

The circumference of the isolator has one of a round or polygonal shape wherein round can be circular, oval etc., polygonal can be triangular, square, pentagonal, hexagonal, octagonal or any other polygonal shape. The first isolator 308 and the third isolator 356 may, as shown in FIGS. 10 and 10A be spaced from outside periphery 363 of first housing boss 364. Such a configuration may provide for vibrations in a shear mode.

The construction around the second fastener 348 may, as shown in FIGS. 10 and 10A, be similar to that of the construction around first fastener 310. For example, the power tool 302 may further include a fourth isolator 360. The fourth isolator 360 may be at least partially positioned in second body boss 352 of the body 304. The second body boss 352 may include a rim 342 to separate and position the second isolator 346 and the fourth isolator 360 with respect to the body 304. The fourth isolator 360 may be tightly fitted to fourth pocket 364 formed in second body boss 352. The housing 306 may further define a second housing boss 368. The second isolator 346 may define a second isolator opening 347 and the fourth isolator 360 may define the fourth isolator opening 362. The second housing boss 368 may, as shown in FIGS. 10 and 10A, be in clearance with the second isolator 346 and the fourth isolator 360. Such configurations provide for vibrations in a shear load mode. The second housing boss 368 defines a second housing boss opening 370 for receiving the second fastener 348.

Figure 11:
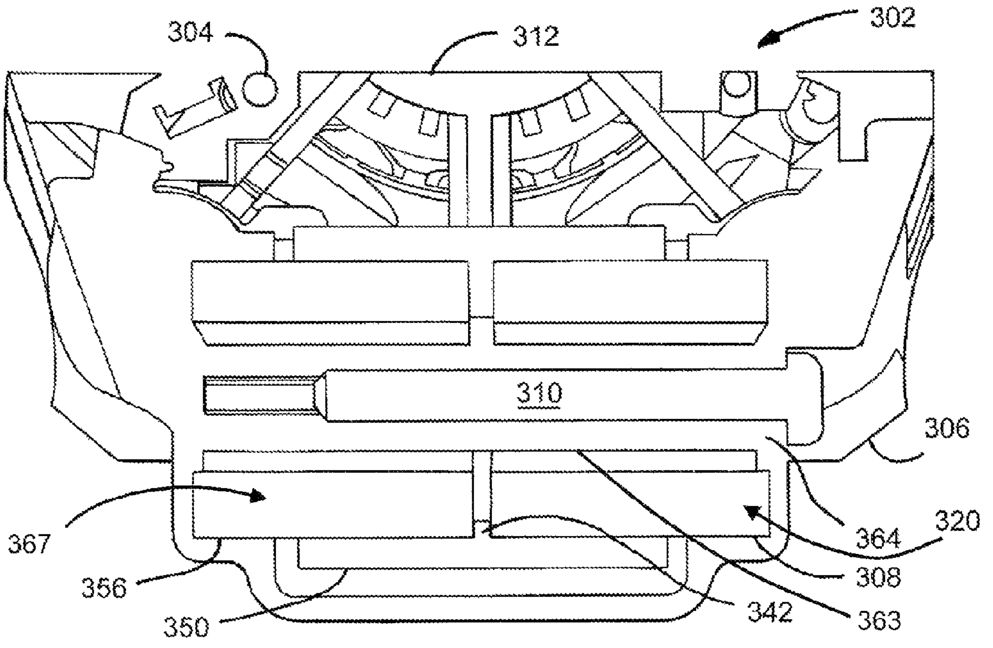
FIG. 11 is a partial enlarged view of FIG. 10.
Figure 11A:
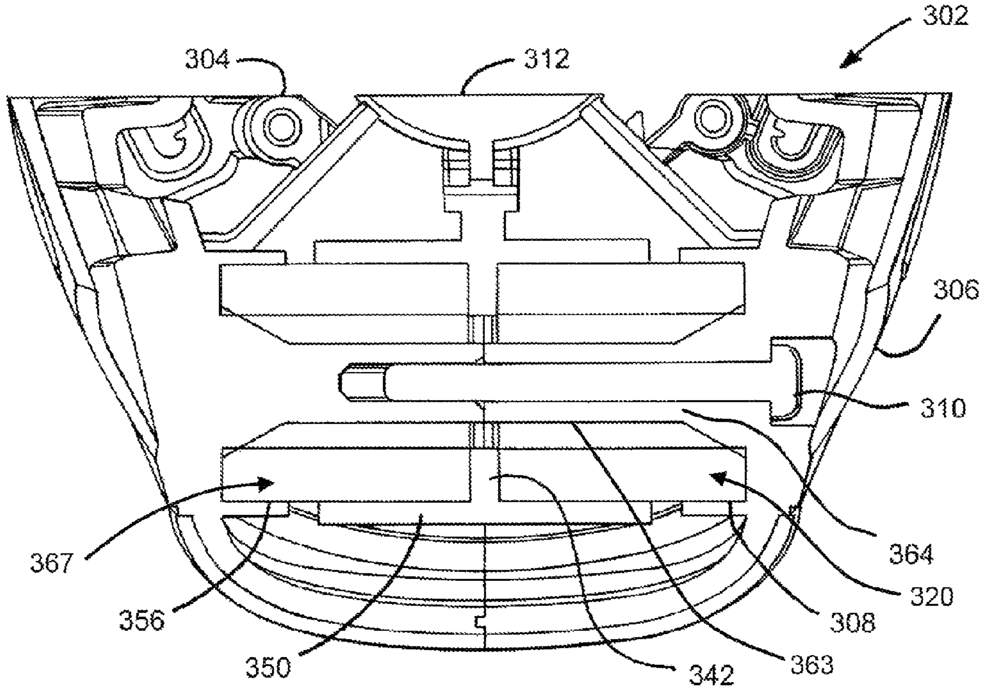
FIG. 11A is a partial enlarged view of FIG. 10A.

Referring now to FIGS. 11 and 11A the first fastener is shown in greater detail in position in first housing boss 364 of the housing 306. The first isolator 308 is positioned over first housing boss 364 in clearance. The first isolator 308 fits in first body boss 350 of the body 304. The second isolator 346 is fitted between first housing boss 364 and first body boss 350. The second isolator 346 may be separated from the first isolator 348 by rim 342. The opposed ends of first isolator 308 are in interference fit with rim 342 and the inner surface of the housing 306. Similarly the opposed ends of the second isolator 346 are in an interference fit between rim 342 of the body 304 and the inner surface of housing 306.

Figure 12:
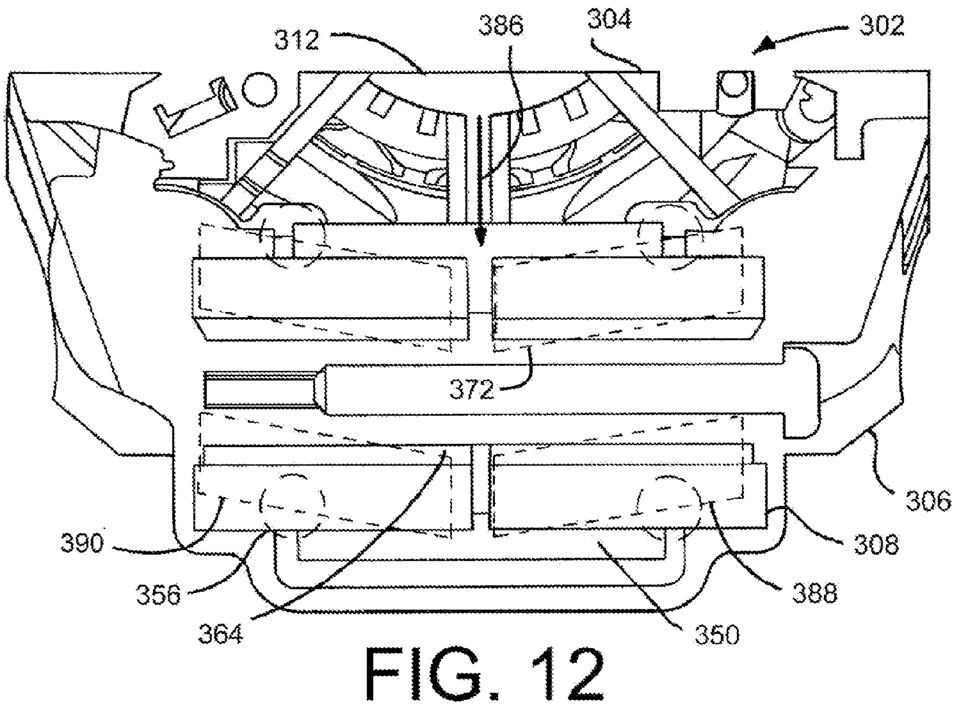
FIG. 12 is a partial enlarged view of FIG. 10, showing the isolator in shear deformation in hidden lines.
Figure 12A:
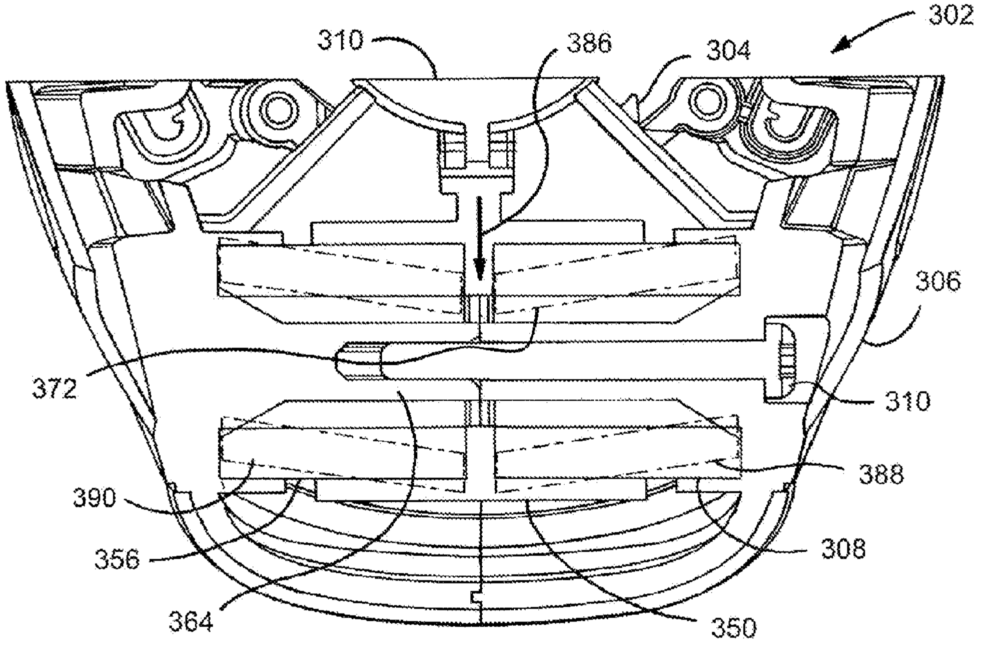
FIG. 12A is a partial enlarged view of FIG. 10A, showing the isolator in shear deformation in hidden lines.
Figure 13:
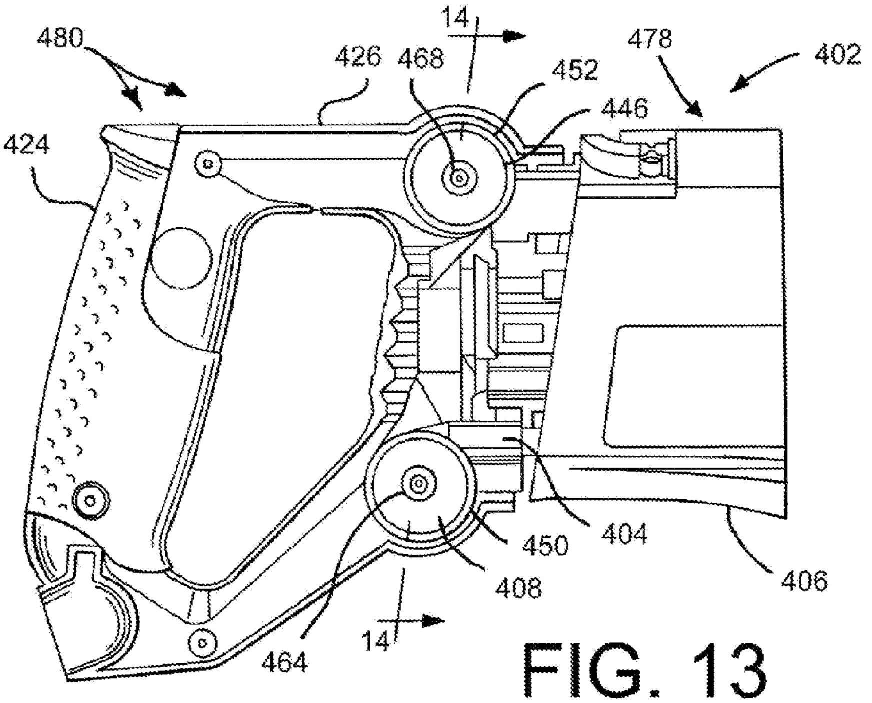
FIG. 13 is a partial plan view of FIG. 10 with a portion of the clam shell removed of a power tool with a vibration isolator with a tight fit with the screw boss according to another embodiment of the present invention.
Figure 13A:
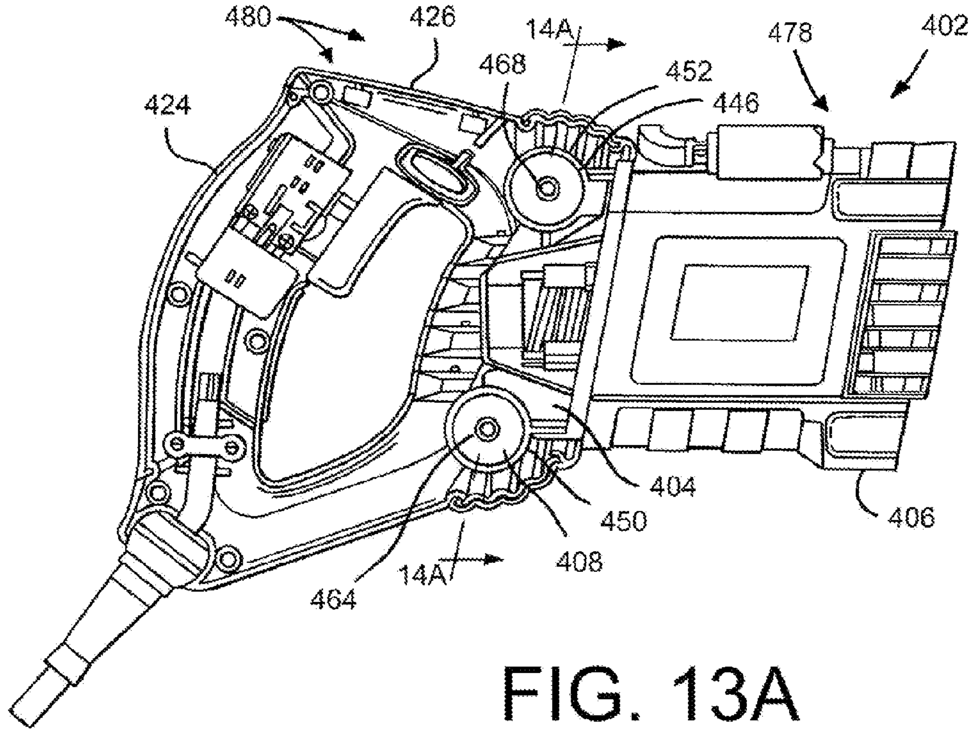
FIG. 13A is a partial plan view of FIG. 10A with a portion of the clam shell removed of a power tool with a vibration isolator with a tight fit with the screw boss according to another embodiment of the present invention.

Referring now to FIGS. 12 and 12A, the first isolator 308 and the third isolator 356 are shown with a load applied in the direction of arrow 386. As the motor 312 and body 304 cause a load in the direction of arrow 386, the first isolator 308 deforms into the deformed shape 388 as shown in hidden lines. Similarly the third isolator 356 is deformed into deformed shape 390 as shown in the hidden line. As shown in FIGS. 12 and 12A, the inside diameter 372 of first isolator 308 is separated from first housing boss 364.

Referring now to FIGS. 13 through 15A yet another embodiment of the present invention is shown as power tool 402. Power tool 402 is very similar to power tool 302 of FIGS. 7 through 12A except that power tool 402 is adapted for use under compression loads. The power tool 402 includes housing 406 which includes a motor housing 478 and a handle housing 480. The handle housing includes a first handle housing portion 424 and a second handle housing portion 426. The handle housing 480 defines a first housing boss 464 and a spaced apart second housing boss 468. Similarly the Power tool 402 includes a body 404 which defines a first body boss 450 and a spaced apart second body boss 452. A first isolator 408 is positioned between the first housing boss 464 and the first body boss 452. Similarly a second isolator 446 is positioned between second housing boss 468 and second body boss 452.

Unlike the power tool 302 the housing bosses are in interference with the isolators. Such a configuration provides for absorption of vibrations of compression loads. For example, the first isolator 408 is interferencely fitted with first housing boss 464. Similarly, second isolator 446 is interferencely fitted with second housing boss 468. An end of first isolator 408 is interferencely fitted with the housing 406. Similarly, second isolator 446 is interferencely fitted with a wall of housing 406. The first isolator 408 is interferencely fitted with first body boss 450 and second isolator 446 is interferencely fitted with second body boss 452.

Figure 14:
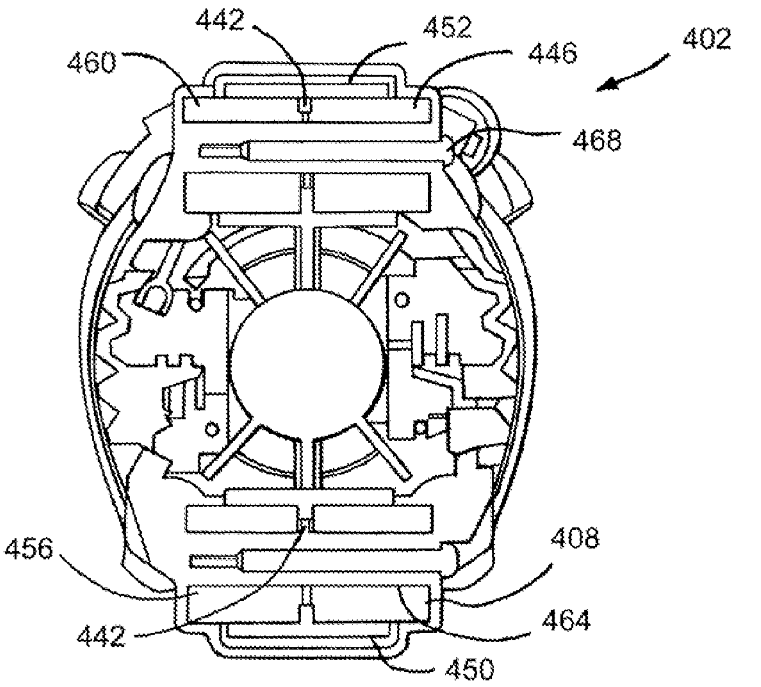
FIG. 14 is a cross sectional view of the power tool of FIG. 13 along the line 14-14 in the direction of the arrows.
Figure 14A:
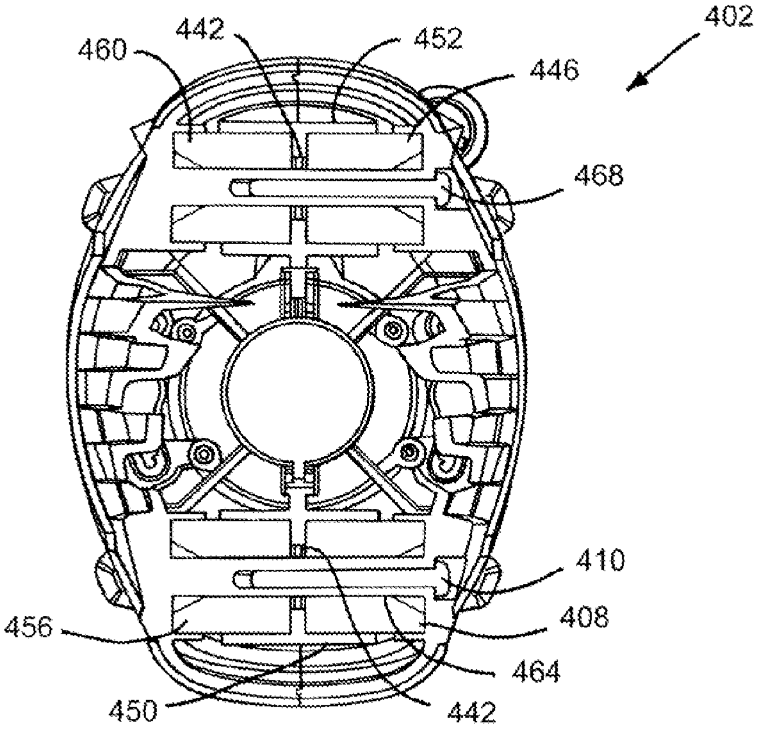
FIG. 14A is a cross sectional view of the power tool of FIG. 13 along the line 14A-14A in the direction of the arrows.

Referring now to FIGS. 14 and 14A, the power tool 402 includes a third isolator 456 positioned between first body boss 450 and first housing boss 464. A rim 442 separates first isolator 408 from third isolator 456. Similarly the power tool 402 further includes a fourth isolator 460 which is positioned between second body boss 452 and second housing boss 468. The rim 442 serves to separate the second isolator 446 from the fourth isolator 460 within the body 404.

Figure 15:
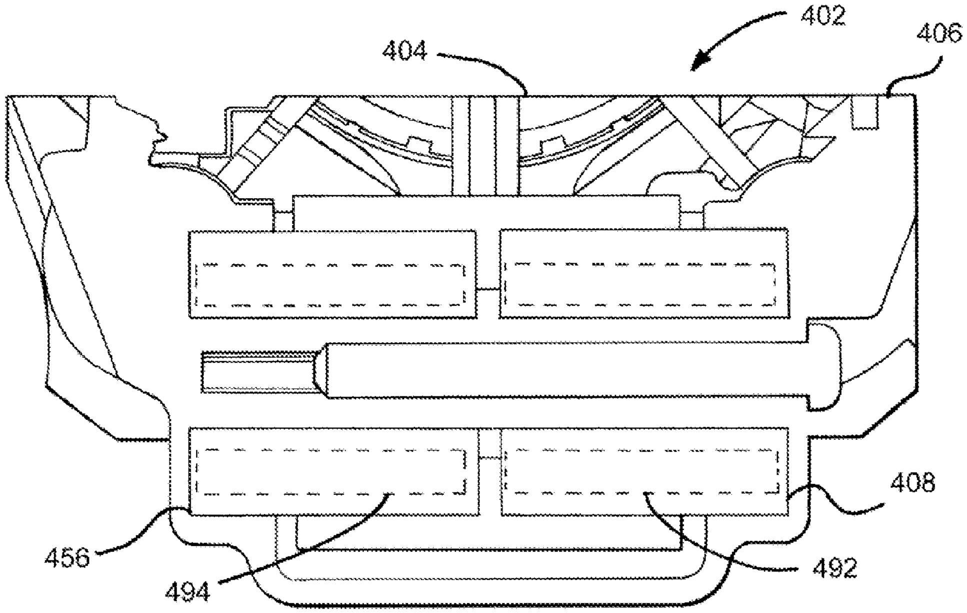
FIG. 15 is a partial enlarged view of FIG. 14, showing the isolator in compression deformation in hidden lines.
Figure 15A:
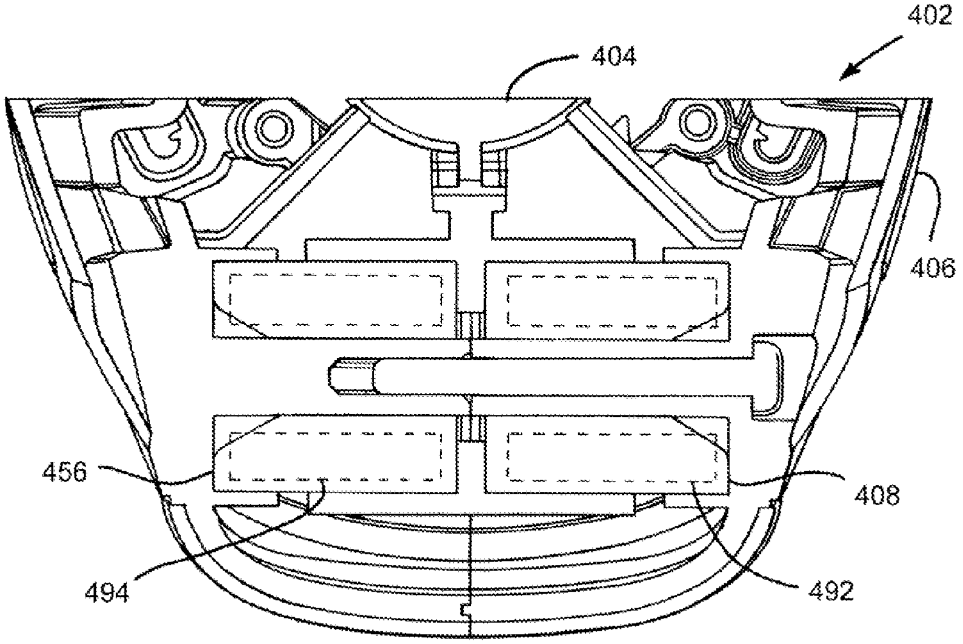
FIG. 15A is a partial enlarged view of FIG. 14A, showing the isolator in compression deformation in hidden lines.

Referring now to FIGS. 15 and 15A, the first isolator 408 and the third isolator 456 are shown in position between the body 404 and the housing 406. The first isolator 408 is positioned between first body boss 450 and the first housing boss 464. The first isolator 408 is also positioned between rim 442 of the first body boss 450 and an interior wall of housing 406. Similarly the third isolator 456 is positioned between first housing boss 464 and first body boss 450. The third isolator is further positioned between rim 442 of the first body boss 450 and the internal wall of the housing 406. The first isolator 408 and the third isolator 456 are interferencely fitted with the first housing boss 464.

As a compression load is applied in the direction of arrow 490 to the power tool 402, the first isolator 408 compresses into first compressed shape 492 as shown in hidden line. Similarly, third isolator 456, when exposed to the load in the direction of arrow 490, compresses to the second compressed shape 494 as shown in the hidden lines. Thus the power tool 402 is designed for use under compression vibration loads.

The illustrated embodiments are suited for use for power tools of all types, particularly for hand held electric power tools.

What is claimed is:

1. A power tool comprising:

a body defining a longitudinal axis and including a first body boss that defines a first open-ended passage arranged perpendicular to the longitudinal axis, a first end portion of the first passage defining a first pocket, a second end portion of the first passage defining a second pocket;

a motor supported by the body, the motor including an output shaft configured to retain a cutting tool;

a housing surrounding at least a portion of said body and said motor and including a handle portion defining a grip, the housing being split into a first housing shell portion and a second housing shell portion along the longitudinal axis, the first housing portion and the second housing portion being attached to each other and defining an interior space in which at least the portion of the body and the motor are received, the first housing portion and the second housing portion including a first portion and a second portion, respectively, of a first housing boss that extends through the first passage defined in the first body boss, the first portion extending into the first pocket and the second portion extending into the second pocket, the first portion and the second portion of the first housing boss defining a first fastener passage arranged perpendicular to the longitudinal axis;

a first isolator positioned at least partially in the first pocket surrounding the first portion of the first housing boss, the first isolator being interposed between said first body boss and said first housing boss and in contact with said body and said housing;

a second isolator positioned at least partially in the second pocket surrounding the second portion of the first housing boss, the second isolator being interposed between said first body boss and said first housing boss and in contact with said body and said housing; and a first fastener that extends through the first fastener passage and that fastens the first housing portion and the second housing portion together, wherein the first pocket and the second pocket of said body are each generally cylindrical, wherein said first body boss defines a rim extending inwardly into the first passage between the first pocket and the second pocket, and wherein the rim is interposed between and separates said first isolator from said second isolator.

2. The power tool of claim 1, wherein the body includes a second body boss that defines a second open-ended passage arranged perpendicular to the longitudinal axis, a first end portion of the second passage defining a third pocket, a second end portion of the second passage defining a fourth pocket;

wherein the first housing portion and the second housing portion include a first portion and a second portion, respectively, of a second housing boss that extends through the second passage defined in the second body boss, the first portion of the second housing boss extending into the third pocket and the second portion of the second housing boss extending into the fourth pocket, the first portion and the second portion of the second housing boss defining a second fastener passage arranged perpendicular to the longitudinal axis;

wherein a third isolator is positioned at least partially in the third pocket surrounding the first portion of the second housing boss, the third isolator being interposed between said second body boss and said second housing boss and in contact with said body and said housing;

wherein a fourth isolator is positioned at least partially in the fourth pocket surrounding the second portion of the second housing boss, the fourth isolator being interposed between said second body boss and said second housing boss and in contact with said body and said housing; and a second fastener that extends through the second fastener passage and that fastens the first housing portion and the second housing portion together.

3. The power tool of claim 2, wherein the said first isolator, said second isolator, said third isolator, and said fourth isolator have substantially the same dimensions.

4. The power tool of claim 2, wherein the said first isolator, said second isolator, said third isolator, and said fourth isolator are made of compressible materials, said first isolator and said second isolator having a first isolator stiffness and said third isolator and said fourth isolator having a second isolator stiffness, the first isolator stiffness being substantially different than the second isolator stiffness.

5. The power tool of claim 4, wherein the said first isolator, said second isolator, said third isolator, and said fourth isolator have substantially the same dimensions.

6. The power tool of claim 1, wherein said first isolator and said second isolator each have a generally cylindrical shape.

7. The power tool of claim 1 wherein said first isolator and said second isolator each define an opening therethrough through which the first portion and the second portion, respectively, of the first housing boss extends;

wherein said boss is positioned at least partially in the opening of said first isolator; and wherein the openings in the first isolator and the second isolator are sized so that the first isolator and the second isolator are spaced apart from an outer periphery of the first portion and an outer periphery of the second portion, respectively of said first housing boss.

8. The power tool of claim 7:

wherein said first body boss defines a rim extending inwardly into the first passage between the first pocket and the second pocket; and wherein the rim is interposed between and separates said first isolator from said second isolator.

9. A power tool comprising:

a body defining a longitudinal axis and including a first body boss that defines a first open-ended passage arranged perpendicular to the longitudinal axis, a first end portion of the first passage defining a first pocket, a second end portion of the first passage defining a second pocket;

a motor supported by the body, the motor including an output shaft configured to retain a cutting tool;

a housing surrounding at least a portion of said body and said motor and including a handle portion defining a grip, the housing being split into a first housing shell portion and a second housing shell portion along the longitudinal axis, the first housing portion and the second housing portion being attached to each other and defining an interior space in which at least the portion of the body and the motor are received, the first housing portion and the second housing portion including a first portion and a second portion, respectively, of a first housing boss that extends through the first passage defined in the first body boss, the first portion extending into the first pocket and the second portion extending into the second pocket, the first portion and the second portion of the first housing boss defining a first fastener passage arranged perpendicular to the longitudinal axis;

a first isolator positioned at least partially in the first pocket surrounding the first portion of the first housing boss, the first isolator being interposed between said first body boss and said first housing boss and in contact with said body and said housing;

a second isolator positioned at least partially in the second pocket surrounding the second portion of the first housing boss, the second isolator being interposed between said first body boss and said first housing boss and in contact with said body and said housing; and a first fastener that extends through the first fastener passage and that fastens the first housing portion and the second housing portion together, wherein said first isolator and said second isolator each define an opening therethrough through which the first portion and the second portion, respectively, of the first housing boss extends, wherein said boss is positioned at least partially in the opening of said first isolator, wherein the openings in the first isolator and the second isolator are sized so that the first isolator and the second isolator are spaced apart from an outer periphery of the first portion and an outer periphery of the second portion, respectively of said first housing boss, wherein said first body boss defines a rim extending inwardly into the first passage between the first pocket and the second pocket, and wherein the rim is interposed between and separates said first isolator from said second isolator.

* * * * *